(12) United States Patent
Kii et al.

(10) Patent No.: US 8,171,519 B2
(45) Date of Patent: May 1, 2012

(54) VIDEO BROADCASTING METHOD, APPARATUS, AND SYSTEM

(75) Inventors: Takahiro Kii, Kawasaki (JP); Hirohisa Naito, Kawasaki (JP); Kazumi Kubota, Kawasaki (JP); Akira Miyazaki, Kawasaki (JP); Yuji Takahashi, Kawasaki (JP); Masanobu Hatanaka, Kawasaki (JP); Toru Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/359,136

(22) Filed: Jan. 23, 2009

(65) Prior Publication Data

US 2009/0187940 A1    Jul. 23, 2009

(30) Foreign Application Priority Data

Jan. 23, 2008    (JP) ................................ 2008-013056

(51) Int. Cl.
 *H04N 7/173* (2011.01)
(52) U.S. Cl. ............. 725/93; 725/116; 725/54; 709/219
(58) Field of Classification Search .............. 725/54–58, 725/87–116, 144–146; 709/217–231
See application file for complete search history.

(56) References Cited

U.S. PATENT DOCUMENTS

| 6,473,902 | B1 * | 10/2002 | Noritomi ........................ 725/91 |
| 6,591,422 | B1 * | 7/2003 | Cesar et al. ..................... 725/95 |
| 6,681,396 | B1 * | 1/2004 | Bates et al. ..................... 725/58 |
| 6,810,526 | B1 * | 10/2004 | Menard et al. ................. 725/46 |
| 6,889,385 | B1 * | 5/2005 | Rakib et al. ................... 725/119 |
| 7,024,681 | B1 * | 4/2006 | Fransman et al. ............. 725/115 |
| 7,107,606 | B2 * | 9/2006 | Lee ................................ 725/87 |
| 7,400,619 | B2 * | 7/2008 | Lee ................................ 370/389 |
| 7,827,582 | B2 * | 11/2010 | Ellis ............................... 725/93 |
| 2007/0294735 | A1 * | 12/2007 | Luo ................................ 725/93 |

FOREIGN PATENT DOCUMENTS

| JP | 2000-050233 A | 2/2000 |
| JP | 2006-67255 A | 3/2006 |

* cited by examiner

*Primary Examiner* — Annan Shang
(74) *Attorney, Agent, or Firm* — Fujitsu Patent Center

(57) ABSTRACT

A video broadcasting method includes assigning channels to a video content based on a total number of channels usable for broadcasting the video contents and a playback time of the video content, calculating a broadcast start time interval of the channels assigned to the video content based on the playback time of the video content and number of the channels assigned to the video content setting broadcast start time per channel of the channels assigned to the video content, and broadcasting the video content at the broadcast start time set per the channel.

11 Claims, 21 Drawing Sheets

FIG. 3A

<LIST OF DIGEST VIDEOS UNDER BROADCASTING>

· DIGEST VIDEO A
  (SCENE OF SCORING FIRST RUN)

· DIGEST VIDEO B
  (SCENE OF SCORING SECOND RUN)

FIG. 3B

"IF YOU WANT TO VIEW DIGEST VIDEO A,
YOU CAN SEE IT AT 'Ch4'"

FIG. 4

| DIGEST VIDEO ID | CHANNEL INFORMATION ||
|---|---|---|
| | CHANNEL NUMBER | BROADCAST START TIME |
| A | Ch1 | 00 sec |
| | Ch2 | 06 sec |
| | Ch3 | 12 sec |
| | Ch4 | 18 sec |
| | Ch5 | 24 sec |
| | Ch6 | 30 sec |
| | Ch7 | 36 sec |
| | Ch8 | 42 sec |
| | Ch9 | 48 sec |
| | Ch10 | 54 sec |
| B | Ch11 | 00 sec and 30 sec |
| | Ch12 | 06 sec and 36 sec |
| | Ch13 | 12 sec and 42 sec |
| | Ch14 | 18 sec and 48 sec |
| | Ch15 | 24 sec and 54 sec |

FIG. 5

| | |
|---|---|
| (A) | NUMBER OF CHANNELS = $\dfrac{\text{PLAYBACK TIME OF DIGEST VIDEO}}{\text{TOTAL PLAYBACK TIME OF DIGEST VIDEOS}}$ * NUMBER OF CHANNELS USABLE FOR BROADCAST |
| (B) | BROADCAST START TIME INTERVAL FOR DIGEST VIDEO = $\dfrac{\text{PLAYBACK TIME OF DIGEST VIDEO}}{\text{NUMBER OF CHANNELS FOR DIGEST VIDEO}}$ |

FIG. 11

| DIGEST VIDEO ID | NUMBER OF VIEWINGS |
|---|---|
| A | 100 |
| B | 50 |

FIG. 12

(A) DEGREE OF IMPORTANCE OF DIGEST VIDEO = PLAYBACK TIME OF DIGEST VIDEO * NUMBER OF VIEWINGS (B) NUMBER OF CHANNELS = $\dfrac{\text{DEGREE OF IMPORTANCE OF DIGEST VIDEO}}{\text{TOTAL DEGREE OF IMPORTANCE OF DIGEST VIDEOS}}$ * NUMBER OF CHANNELS USABLE FOR BROADCAST

FIG. 16

| DIGEST VIDEO ID | BROADCAST TIME |
|---|---|
| A | 18:30:00 HOURS |
| B | 18:20:00 HOURS |

FIG. 17

| VIEWER ID | REGISTRATION TIME |
|---|---|
| △△△△ | 18:25:00 HOURS |
| ◇◇◇◇ | 18:10:00 HOURS |

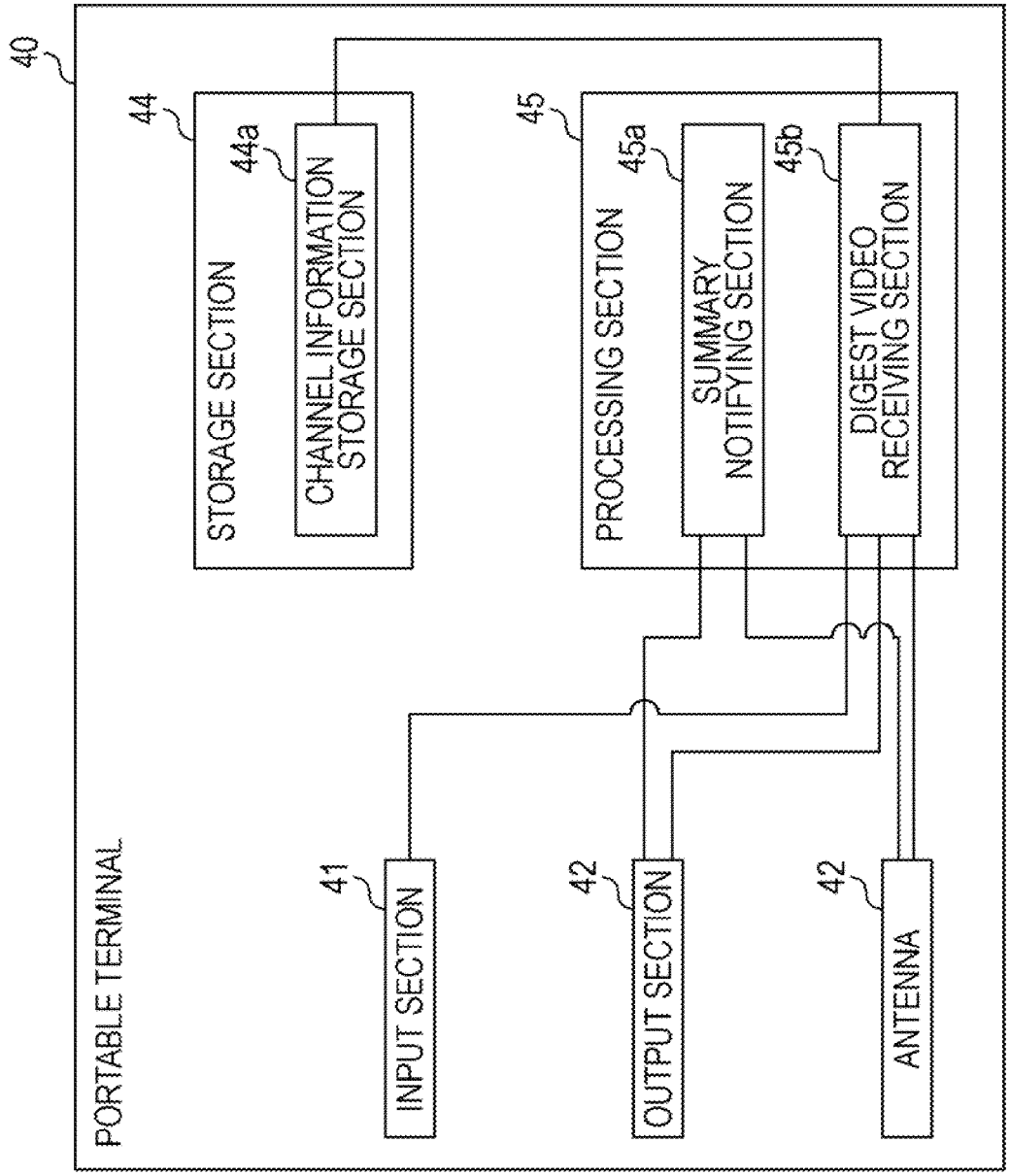

VIDEO BROADCASTING METHOD, APPARATUS, AND SYSTEM

CROSS-REFERENCE TO RELATED APPLICATIONS

This application is based upon and claims the benefit of priority of the prior Japanese Patent Application No. 2008-013056, filed on Jan. 23, 2008, the entire contents of which are incorporated herein by reference.

FIELD

The present invention relates to video broadcasting.

BACKGROUND

In TV broadcast, digest videos are edited in some programs (for example, a digest of videos of scoring scenes is edited in live broadcast of baseball games). As one example of a technique regarding such TV broadcast, a broadcasting apparatus is disclosed which edits digest videos into a program and broadcasts those digest videos.

However, the TV broadcast using the disclosed broadcasting apparatus has problems that a viewer may miss the digest videos and an extra cost may be required for a viewer to view the digest videos.

More specifically, with the TV broadcast using the disclosed broadcasting apparatus, the digest videos are not broadcast in many times, and hence a viewer may miss the digest videos.

A viewer can download the digest videos through an Internet access, but downloading the digest videos requires an additional communication cost in some cases.

SUMMARY

An embodiment of the present invention provides a video broadcasting method including assigning channels to a video content based on a total number of channels usable for broadcasting the video contents and a playback time of the video content, calculating a broadcast start time interval of the channels assigned to the video content based on the playback time of the video content and number of the channels assigned to the video content setting a broadcast start time per channel of the channels assigned to the video content, and broadcasting the video content at the broadcast start time set per the channel.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3A depicts information to be displayed on an output section according to an example of an embodiment of the present invention;

FIG. 3B depicts information to be displayed on an output section according to an example of an embodiment of the present invention;

FIG. 4 depicts information stored in a channel information storage section according to an example of an embodiment of the present invention;

FIG. 5 depicts formulae for explaining processing executed by a channel information setting section according to an example of an embodiment of the present invention;

FIG. 11 depicts information stored in a number-of-viewings storage section according to an example of an embodiment of the present invention;

FIG. 12 depicts formulae for explaining processing executed by a channel information setting section according to an example of embodiment of the present invention;

FIG. 16 depict information stored in a broadcast time storage section according to an example of an embodiment of the present invention;

FIG. 17 depicts information stored in a viewer ID storage section according to an example of an embodiment of the present invention;

FIG. 20 depicts a configuration of a portable terminal according to an example of embodiment of the present invention;

DESCRIPTION OF EMBODIMENTS

In consideration of the above-described state of the art, intensive studies have been conducted on a video broadcasting program storage medium, a video broadcasting method, a video broadcasting apparatus, and a video broadcasting system, which enable viewers to view missed digest videos without requiring an additional communication cost.

Examples of the video broadcasting program storage medium, the video broadcasting method, the video broadcasting apparatus, and the video broadcasting system according to examples of embodiments of the present invention will be described in detail below with reference to the accompanying drawings. Note that the following description is made on an example of the video broadcasting apparatus for broadcasting digest videos (video contents) to a portable terminal (video playback device) having the TV function.

Figure 1A:
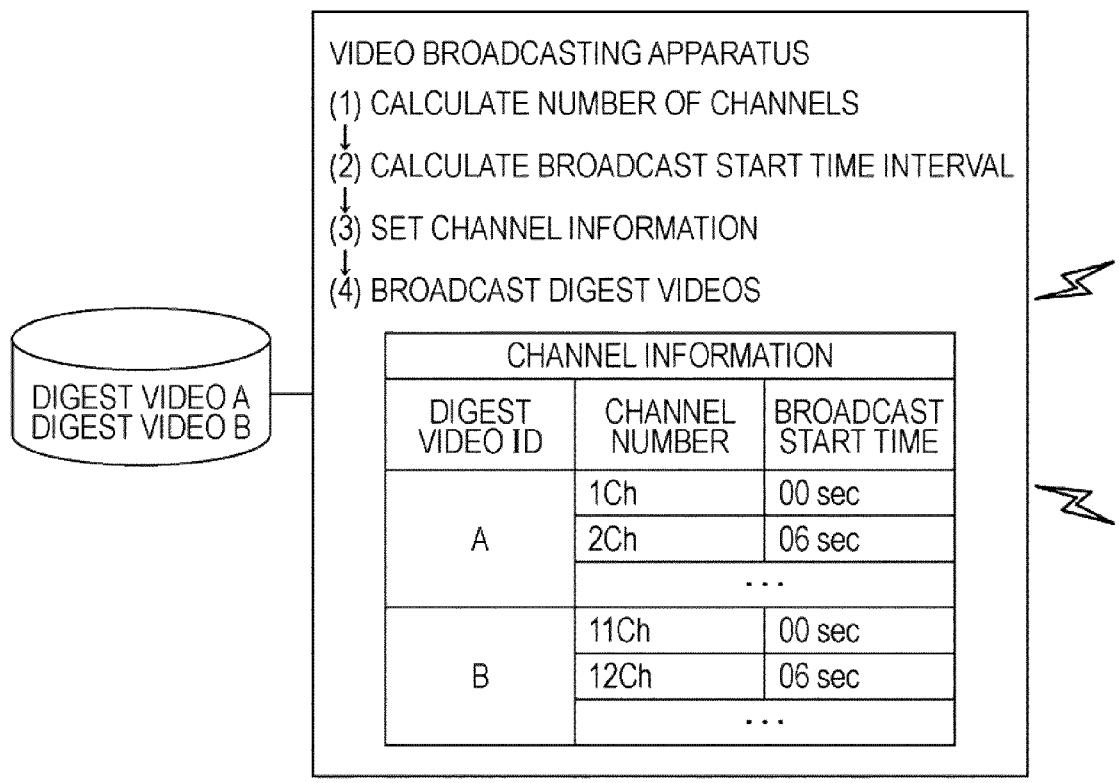
FIG. 1A depicts a video broadcasting apparatus according to an example of an embodiment of the present invention.
Figure 1B:
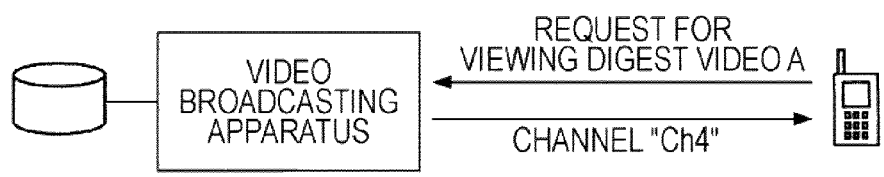
FIG. 1B depicts a video broadcasting system according to an example of an embodiment of the present invention.

FIGS. 1A and 1B are diagrams for explaining a video broadcasting apparatus. The video broadcasting apparatus of FIGS. 1A and 1B broadcast digest videos at the same time so that a portable terminal with a TV function can play back the digest videos. The video broadcasting apparatus is primarily featured in enabling viewers to view the missed digest videos without requiring an additional communication cost.

More specifically, when broadcasting a digest video A and a digest video B, for example, the video broadcasting apparatus of FIGS. 1A and 1B calculates an assigned number of channels to be assigned per digest video based on the total number of channels usable for broadcasting the digest videos and a playback time of each digest video, as indicated by (1) in FIG. 1A.

Then, as indicated by (2) in FIG. 1A, the video broadcasting apparatus calculates, based on the playback time of each digest video and the assigned number of channels for each digest video, a broadcast start time interval per digest video when the same digest video is broadcast plural times. For example, the broadcast start time interval is calculated such that the broadcast of the digest video A is started at an interval of "6 sec" and the broadcast of the digest video B is also started at an interval of "6 sec".

Then, as indicated by (3) in FIG. 1A, the video broadcasting apparatus sets, for each digest video, channel information including, in a mutually corresponding relation, a digest video ID specifying the digest video, channel numbers corresponding to the assigned number of channels which are assigned to the relevant digest video, and a broadcast start time set per channel number at the broadcast start time interval. For example, the channel information is set such that the broadcast of the digest video A is started at the interval of "6 sec" at the channel numbers "Ch1 to Ch10" so as to, for example, start the broadcast of the digest video A at the channel number "Ch2" after "6 sec" from the start of broadcasting the digest video A at the channel "Ch1", and such that the broadcast of the digest video B is started at the interval of "6 sec" at the channel numbers "Ch1 to Ch15".

Then, as indicated by (4) in FIG. 1A, the video broadcasting apparatus broadcasts the same digest video at the broadcast start time set per channel number in accordance with the channel information.

Then, as shown in FIG. 1B, when a request for viewing the digest video A is received at a time "13 sec", for example, the video broadcasting apparatus specifies, based on the channel information, the channel number "Ch4" from among the channel numbers "Ch1 to Ch10" corresponding to the digest video ID "A" of the digest video A, which is set to a broadcast start time (e.g., "18 sec") later than the time when the viewing request has been received. The specified channel number is then notified to a viewing request source.

Through those procedures, as per the main feature mentioned above, the video broadcasting apparatus of FIGS. 1A and 1B enables viewers to view the missed digest videos without requiring an additional communication cost.

Figure 2:
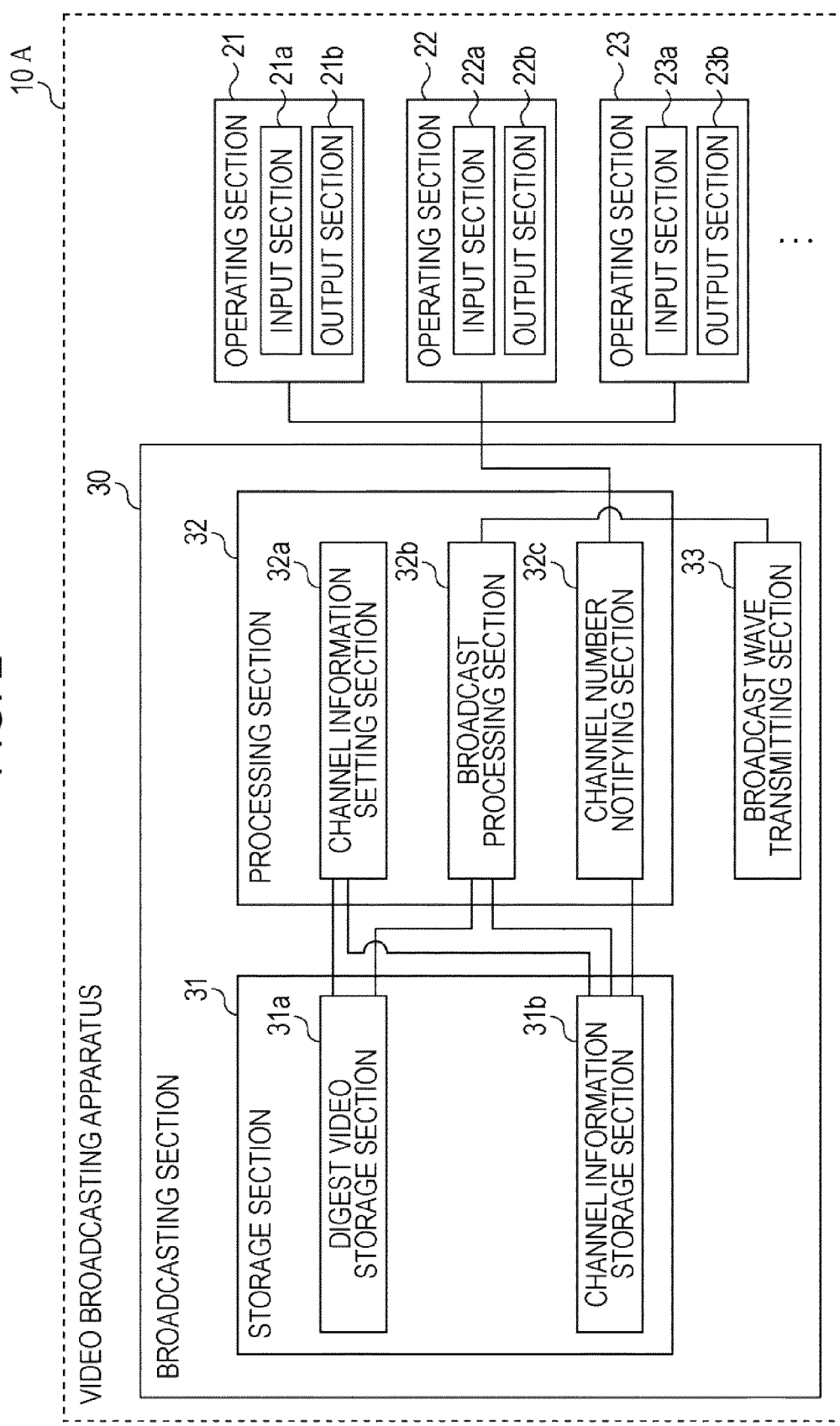
FIG. 2 depicts a configuration of a video broadcasting apparatus according to an example of an embodiment of the present invention.

The configuration of the video broadcasting apparatus, shown in FIGS. 1A and 1B, will be described below with reference to FIGS. 2 to 5. FIG. 2 is a block diagram showing the configuration of the video broadcasting apparatus. FIGS. 3A and 3B illustrate examples of information output to be displayed on an output section. FIG. 4 illustrates one example of information stored in a channel information storage section. FIG. 5 illustrates formulae for explaining the processing executed by a channel information setting section. As shown in FIG. 2, a video broadcasting apparatus 10A comprises operating sections 21 to 23 and a broadcasting section 30.

The operating sections 21 to 23 are, e.g., electronic bulletin boards for providing information to an indefinite number of viewers. The operating sections 21 to 23 are individually connected to the broadcasting section 30 in a state capable of performing communication therebetween and have respective input sections and output sections. In the following, components of the operating section 21 are described on the assumption that each of the operating sections 21 to 23 has the same configuration and executes the same processing.

The input section 21a receives input of various kinds of information. More specifically, the input section 21a includes operating buttons, a touch panel, an IC card reader, a keyboard, a mouse, a microphone, etc., and it receives, e.g., a request for viewing a digest video from a viewer.

The output section 21b outputs various kinds of information. More specifically, the output section 21b includes a monitor, a display, a touch panel, an IC card writer, a speaker, etc. The output section 21b outputs and displays, e.g., a list of digest videos shown in FIG. 3A, and a message indicating, as shown in FIG. 3B, that the broadcast of the digest video A is scheduled at the channel number "Ch4".

The broadcasting section 30 executes a digest video broadcasting process and also serves as a management apparatus for executing a process in response to information received from viewers through the operating sections 21 to 23. The broadcasting section 30 includes a storage section, e.g., a memory, 31, a processing section 32, and a broadcast wave transmitting section 33.

The storage section 31 stores data and programs which are required for various processes executed by the processing section 32. As components closely related to the present invention, in particular, the storage section 31 includes a digest video storage section 31a, and a channel information storage section 31b.

The digest video storage section 31a stores digest videos. More specifically, the digest video storage section 31a stores the digest video A and the digest video B. Herein, the term "digest video" means, for example, a digest of videos of scoring scenes edited in live broadcast of baseball games.

The channel information storage section 31b stores, as shown in FIG. 4, a digest video ID (e.g., "A") specifying the digest video, a channel number (e.g., "Ch1") specifying the channel assigned, and a broadcast start time (e.g., "00 sec") in a mutually corresponding relation. The information stored in the channel information storage section 31b is stored by a channel information setting section 32a described later.

The processing section 32 includes an internal memory for storing control programs such as an OS (Operating System), programs prescribing various processing procedures, and necessary data, and it executes various processes by using them. As components closely related to the present invention, in particular, the processing section 32 includes a channel information setting section 32a, a broadcast processing section 32b, and a channel number notifying section 32c.

The channel information setting section 32a calculates the assigned number of channels, i.e., a value of individual channel numbers, assigned to each digest video based on the total number of channels usable for broadcasting the digest videos and the playback time of each digest video.

Further, based on the playback time of each digest video and the assigned number of channels, the channel information setting section 32a calculates the broadcast start time interval per digest video when the same digest video is broadcast plural times.

In addition, the channel information setting section 32a sets, for each digest video, the digest video ID, the channel numbers, and the broadcast start time per channel number at the calculated broadcast start time interval in a mutually corresponding relation.

For the purpose of describing the above process in connection with one practical example, it is assumed that "15" is previously set as the total number of usable channels, and the digest video A having a playback time of "60 sec" and the digest video B having a playback time of "30 sec" are stored in the digest video storage section 31a.

Upon receiving the broadcast start request through any of the input sections 21a to 23a, the channel information setting section 32a calculates the assigned number of channels per digest video by using a formula shown at (A) in FIG. 5. In the formula, "*" is a multiplication sign.

For example, the channel information setting section 32a calculates "10" as the assigned number of channels for the digest video A (namely, the number "10" of channels is calculated by multiplying the total number of usable channels, i.e., "15", by a value that is resulted from dividing the playback time of the digest video A, i.e., "60 sec", by a total playback time of the digest video A and the digest video B, i.e., "60 sec+30 sec").

Also, the channel information setting section 32a calculates "5" as the assigned number of channels for the digest video B (namely, the number "5" of channels is calculated by multiplying the total number of usable channels, i.e., "15", by a value that is resulted from dividing the playback time of the digest video B. i.e., "30 sec", by the total playback time of the digest video A and the digest video B, i.e., "60 sec+30 sec").

Subsequently, the channel information setting section 32a calculates, by using a formula shown at (B) in FIG. 5, the broadcast start time interval per digest video when the same digest video is broadcast plural times.

For example, the channel information setting section 32a calculates "6 sec" as the broadcast start interval for the digest video A (namely, the "6 sec" is calculated by dividing the playback time of the digest video A, i.e., "60 sec", by the assigned number of the channels for the digest video A, i.e., "10").

Also, the channel information setting section 32a calculates "6 sec" as the broadcast start interval for the digest video B (namely, the "6 sec" is calculated by dividing the playback time of the digest video B, i.e., "30 sec", by the assigned number of the channels for the digest video B, i.e., "5").

Subsequently, the channel information setting section 32a sets, for, e.g., the digest video A, the channel information including the digest video ID "A", the channel numbers "Ch1 to Ch10", and the broadcast start time changed at the interval of "6 sec" in a mutually corresponding relation, and it stores the set channel information in the channel information storage section 32b (see FIG. 4).

In the example shown in FIG. 4, the broadcast of the digest video A is started at the interval of "6 sec" in the order of the channel numbers "Ch1", "Ch2", . . . "Ch10" in such a manner that the broadcast of the digest video A is initially started at the channel number "Ch1", and after the elapse of "6 sec", the broadcast of the digest video A is started at the channel number "Ch2", and so on. Further, when "6 sec" is elapsed after starting the broadcast of the digest video A at the channel number "Ch10" (namely, when "00 sec" is reached), the broadcast of the digest video A is started at the channel number "Ch1" again.

Also, the broadcast of the digest video B is started at the interval of "6 sec" in the order of the channel numbers "Ch11", "Ch12", . . . "Ch15" in such a manner that the broadcast of the digest video B is initially started at the channel number "Ch11", and after the elapse of "6 sec", the broadcast of the digest video B is started at the channel number "Ch12", and so on. Further, when "6 sec" is elapsed after starting the broadcast of the digest video B at the channel number "Ch15" (namely, when any of "00 sec" and "30 sec" is reached), the broadcast of the digest video B is started at the channel number "Ch11" again.

The broadcast processing section 32b broadcasts the same video content at the broadcast start time set per channel number in accordance with the channel information that has been set by the channel information setting section 32a.

More specifically, after the channel information has been stored in the channel information storage section 31b, the broadcast processing section 32b reads the digest video A and the digest video B from the digest video storage section 31a, followed by starting the broadcast of the digest video A at the channel number "Ch1" and starting the broadcast of the digest video B at the channel number "Ch11". Then, after the elapse of "6 sec", the broadcast processing section 32b starts the broadcast of the digest video A at the channel number "Ch2" and starts the broadcast of the digest video B at the channel number "Ch12". Subsequently, the broadcast processing section 32b similarly starts the broadcast of the digest video at each channel number in an appropriately repeated sequence to broadcast the digest video A at the channel numbers "Ch1 to Ch10" and the digest video B at the channel numbers "Ch11 to Ch15" so that the same digest video is broadcast in plural times.

The channel number notifying section 32c produces a list of the digest videos when the channel information is stored in the channel information storage section 31b, and it outputs the list of the digest videos for displaying it through the output sections 21b to 23b of the operating sections 21 to 23 (see FIG. 3A).

Further, upon receiving the request for viewing the digest video, the channel number notifying section 32c specifies, based on the channel information, one from among the channel numbers corresponding to the digest video ID of the digest video demanded by the viewing request, which is set to a broadcast start time later than the time when the viewing request has been received. The specified channel number is then notified to the viewing request source.

Describing the above process in connection with one practical example, when a request for viewing the digest video A is received at a time "13 sec" through the input section 21a of the operating section 21, the channel number notifying section 32c reads the channel information from the channel information storage section 31b and specifies the channel number "Ch4" from among the channel numbers "Ch1 to Ch10" corresponding to the digest video ID "A", which is set to the broadcast start time "18 sec".

Then, the channel number notifying section 32c notifies, through the output section 21b of the operating section 21, that the broadcast of the digest video A is scheduled at the channel number "Ch4" (see FIG. 3B).

Note that the method of notifying the channel number by the video broadcasting apparatus 10A does not limit the present invention, and any suitable method of notifying the channel number to the portable terminal through the output section 21b of the operating unit 21 can also be used. For example, the channel number may be notified to the portable terminal by using an IC card reader/writer such that the channel number is displayed on the output section of the portable terminal. As an alternative, the channel number may be notified from the video broadcasting apparatus 10A to the portable terminal with the non-contact IC (RFID) communication function, and the portable terminal may automatically change the channel number to the notified one and receive the digest video broadcast from the video broadcasting apparatus 10A.

The broadcast wave transmitting section 33 transmits broadcast waves at each channel number. More specifically, the broadcast wave transmitting section 33 broadcasts the digest videos by transmitting radio signals at each of the channel numbers set for the broadcast.

Figure 6:
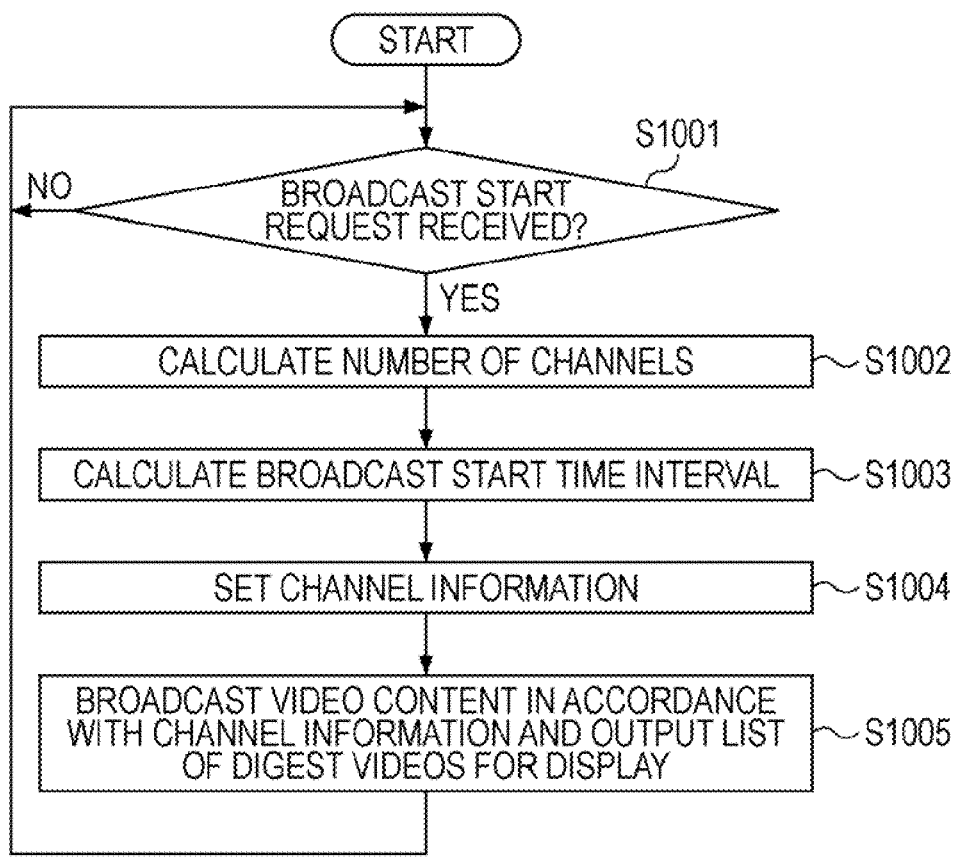
FIG. 6 depicts a digest video broadcasting process according to an example of an embodiment of the present invention.
Figure 7:
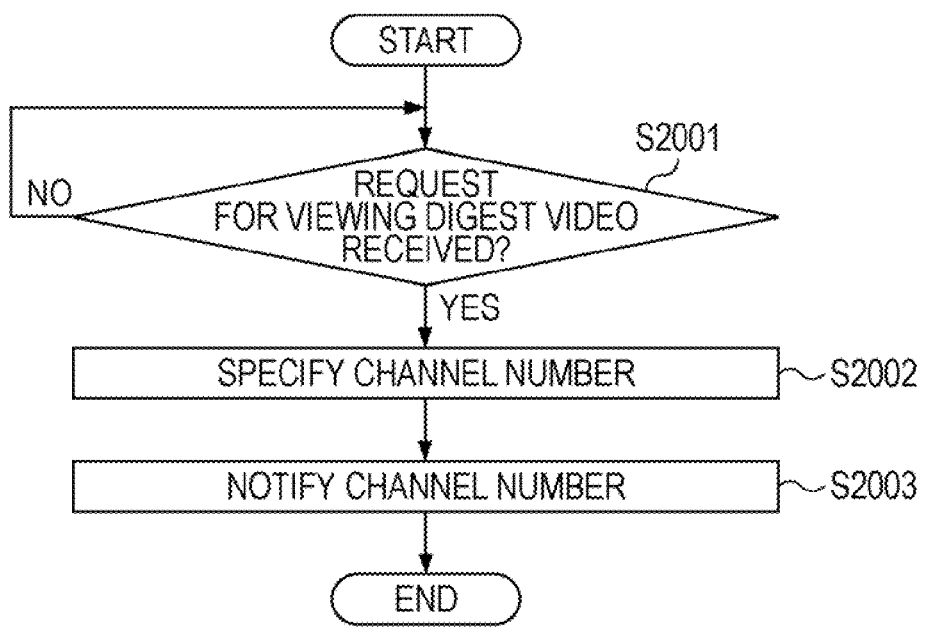
FIG. 7 depicts a channel number notifying process according to an example of an embodiment of the present invention.

A digest video broadcasting process and a channel number notifying process executed by the video broadcasting apparatus 10A will be described below with reference to FIGS. 6 and 7. FIG. 6 is a flowchart showing the flow of the digest video broadcasting process executed by the video broadcasting apparatus. FIG. 7 is a flowchart showing the flow of the channel number notifying process executed by the video broadcasting apparatus.

As shown in FIG. 6, upon receiving the broadcast start request ("Yes" in step S1001), the video broadcasting apparatus 10A calculates the number of channels per digest video (step S1002), calculates the broadcast start time interval per digest video (step S1003), and sets the channel information (step S1004).

Then, the video broadcasting apparatus 10A broadcasts the same video content at the broadcast start time set per channel number in accordance with the channel information and outputs a list of the digest videos for displaying it (step S1005). Thereafter, the video broadcasting apparatus 10A repeatedly executes the above-described processing (steps S1001 to S1005). The digest video broadcasting process executed by the video broadcasting apparatus 10A is brought to an end at the same time as when the operation of the video broadcasting apparatus 10A is stopped.

As shown in FIG. 7, upon receiving the request for viewing the digest video ("Yes" in step S2001), the video broadcasting apparatus 10A specifies the channel number which is set to a broadcast start time later than the time when the viewing request has been received (step S2002), and notifies the specified channel number to the viewing request source (step S2003). The channel number notifying process is then brought to an end.

As described above, the video broadcasting apparatus of FIGS. 1A and 1B enables viewers to view the missed digest videos without requiring an additional communication cost. For example, even if viewers missed digest videos edited in a TV program, they can view the missed digest videos.

Also, according to the video broadcasting apparatus of FIGS. 1A and 1B, since the broadcast channel is notified to the viewing request source, the viewer can be released from the need of a quick action for finding the channel number at which the digest video is broadcast (e.g., the need of zapping).

The foregoing description is couched in connection with the case of specifying the channel number which is set to a broadcast start time later than the time when the viewing request has been received, the channel number may be specified to one which is set to a broadcast start time later than a time resulting from adding, to the time when the viewing request has been received, a preparation time required for the portable terminal to receive the digest video. Taking into account the above point, another circumstance is described below in connection with the case of specifying the channel number which is set to be later than a broadcast start time resulting from adding, to the time when the viewing request has been received, the preparation time required for the portable terminal to receive the digest video.

Figure 8:
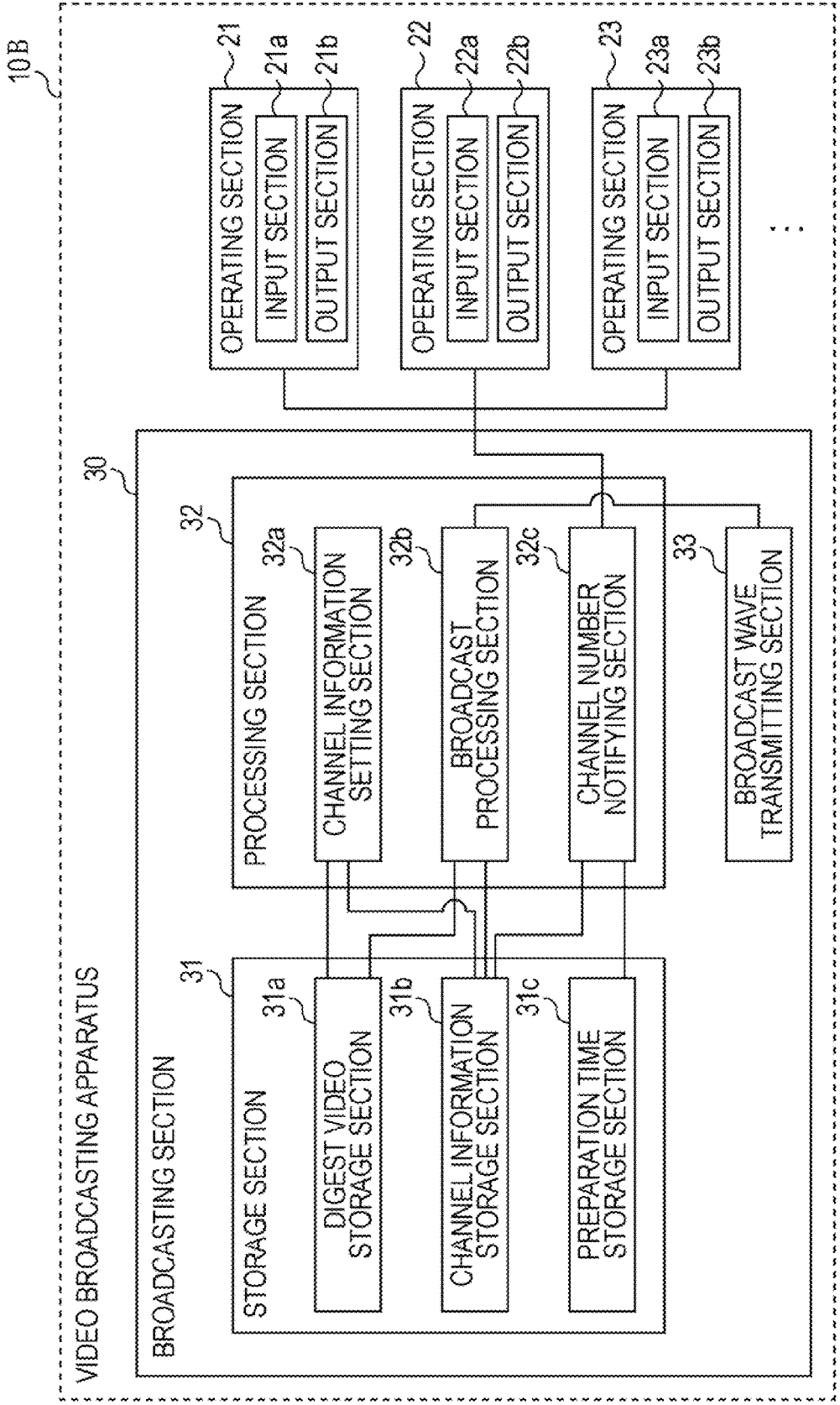
FIG. 8 depicts a video broadcasting apparatus according to another example of an embodiment of the present invention.

FIG. 8 depicts a configuration of another video broadcasting apparatus. The configuration of the video broadcasting apparatus 10B in FIG. 8 differs from that of the video broadcasting apparatus 10A in FIG. 2, e.g., by additionally including a preparation time storage section 31c and points described below.

More specifically, the preparation time storage section 31c previously stores a preparation time required for the portable terminal to receive the digest video. Herein, the term "preparation time" means, for example, a time required to start up a TV receiving application in the portable terminal (e.g., "10 sec").

The channel number notifying section 32c specifies, based on the channel information set by the channel information setting section 32a, the channel number which is set to a broadcast start time later than a time resulting from adding, to the time when the viewing request has been received, the preparation time stored in the preparation time storage section 31c.

Describing the above process in connection with one practical example, when a request for viewing the digest video A is received at a time "13 sec" through the operating section 21, the channel number notifying section 32c reads the preparation time (e.g., "10 sec") from the preparation time storage section 31c and calculates a start reference time "23 sec" by adding "10 sec" to the time "13 sec" when the viewing request has been received.

Then, the channel number notifying section 32c reads the channel information from the channel information storage section 31b and specifies the channel number "Ch5" which is set to a broadcast start time (e.g., "24 sec") later than the calculated start reference time.

A channel number notifying process executed by a video broadcasting apparatus will be described below with reference to FIG. 9.

Figure 9:
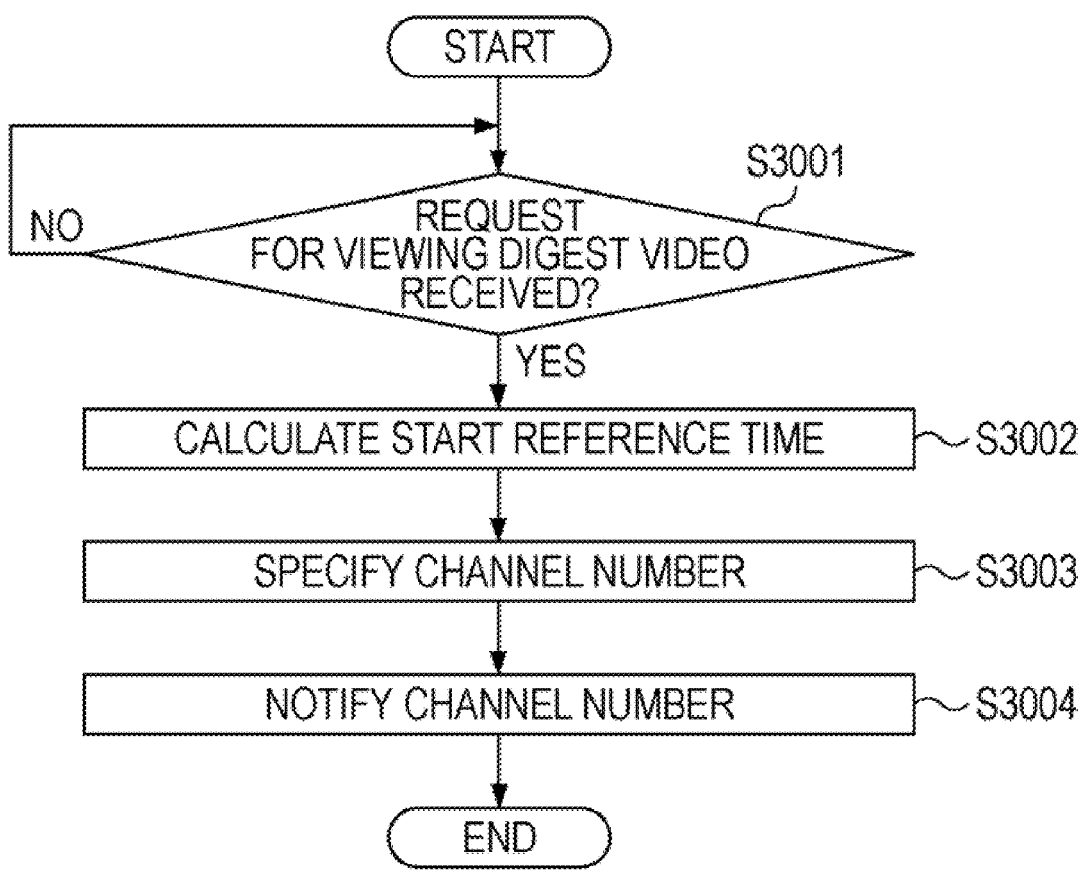
FIG. 9 depicts a channel number notifying process according to another example of an embodiment of the present invention.

As shown in FIG. 9, upon receiving the request for viewing the digest video ("Yes" in step S3001), the video broadcasting apparatus 10B calculates the start reference time by adding the preparation time to the time when the viewing request has been received (step S3002), and specifies the channel number which is set to a broadcast start time later than the calculated start reference time (step S3003).

Further, the video broadcasting apparatus 10B notifies the specified channel number to the viewing request source (step S3004), and then brings the channel number notifying process to an end.

The process of FIG. 9 can reduce a risk that a viewer may start to view the digest video after the start of the broadcast of the digest video at the channel number which has been notified to the viewer. In other words, since the specified channel number starts broadcasting, for example, after the viewer has started up the TV receiving application in the portable terminal, it is possible to reduce a risk that the viewer may start viewing after the broadcast of the digest video has been started (namely, a risk that the portable terminal may start to play back the digest video from an intermediate point thereof).

Alternatively, the apparatus and/or process described above can be modified so as to count the number of times the request for viewing the digest video has been received (i.e., the number of viewings), and to recalculate the number of channels based on the counted number of viewings.

Figure 10:
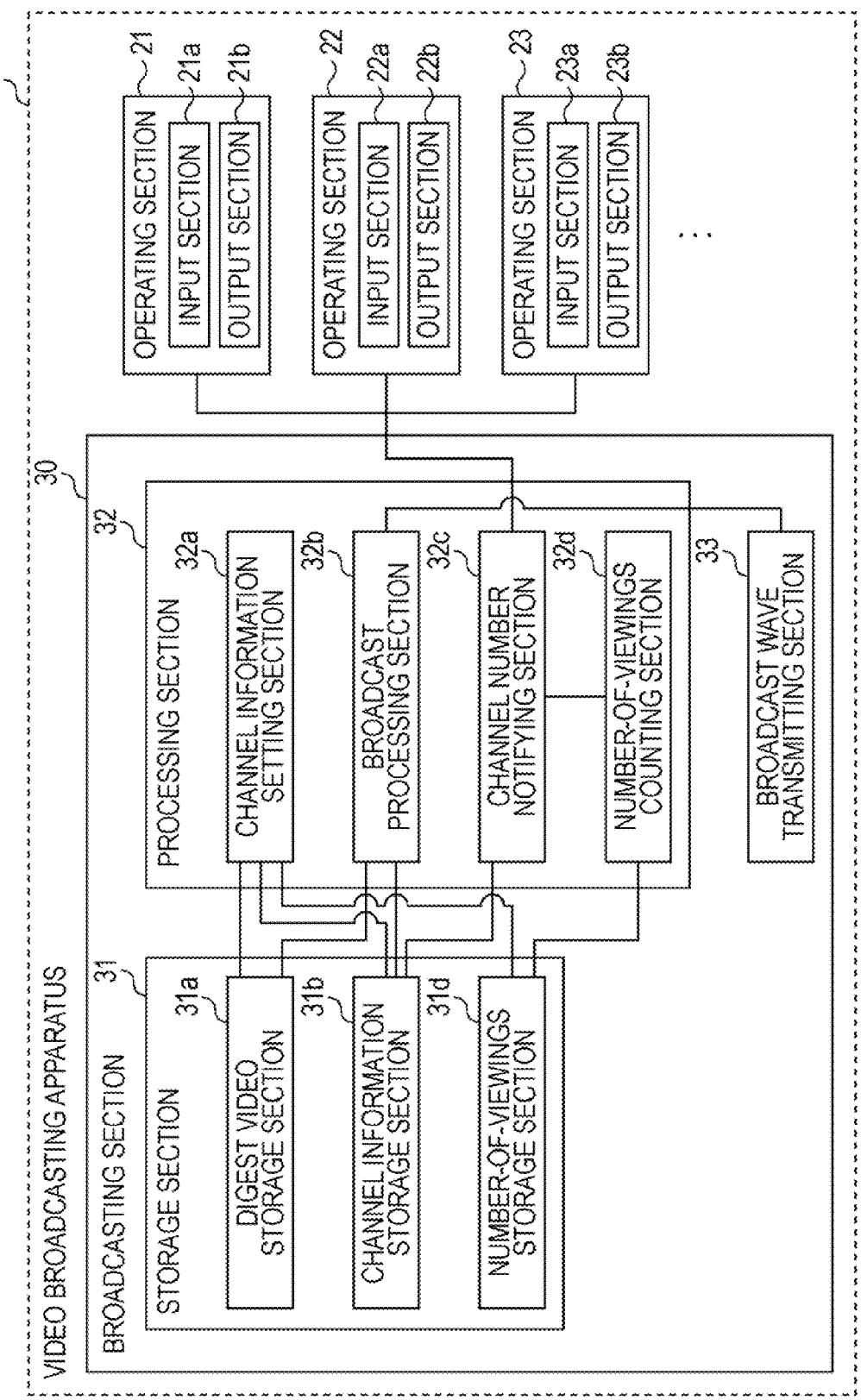
FIG. 10 depicts a video broadcasting apparatus according to another example of an embodiment of the present invention.

Taking into account the above point, still another circumstance is described below in connection with the case of recalculating the assigned number of channels based on the number of viewings. FIG. 10 is a block diagram showing the configuration of another video broadcasting apparatus 10C. FIG. 11 illustrates one example of information stored in a number-of-viewings storage section. FIG. 12 illustrates formulae for explaining the processing executed by a channel information setting section.

The configuration of the video broadcasting apparatus 10C differs from that of the video broadcasting apparatus 10B, e.g., additionally including a number-of-viewings storage section 31d and a number-of-viewings counting section 32d, as well as points described below.

The number-of-viewings storage section 31d stores, per video content, the number of times the viewing request has been received (i.e., the number of viewings). More specifically, as shown in FIG. 11, the number-of-viewings storage section 31d stores the number of viewings in a corresponding relation to the digest video ID. Information stored in the number-of-viewings storage section 31d is updated by the number-of-viewings counting section 32d described later.

The number-of-viewings counting section 32d counts, per digest video, the number of times the viewing request has been received (i.e., the number of viewings). More specifically, when the channel number notifying section 32c receives the request for viewing the digest video, the number-of-viewings counting section 32d updates the number of viewings, which is stored in the number-of-viewings storage section 31d in a corresponding relation to the digest video ID of the requested digest video, by adding "1" thereto.

Upon receiving a request for changing the channel information, the channel information setting section 32a calculates a degree of importance per digest video based on the counted number of viewings for the digest video, and recalculates the number of channels, which are assigned per digest video, by multiplying the total number of channels by a value that is resulted from dividing each degree of importance by a total degree of importance.

For the purpose of describing the above process in connection with one practical example, it is assumed that "15" is previously set as the total number of usable channels, the digest video A having a playback time of "60 sec" and the digest video B having a playback time of "30 sec" are stored in the digest video storage section 31a, and the number of viewings "100" and the number of viewings "50" are stored in the number-of-viewings storage section 31d in a corresponding relation to the digest video ID "A" and the digest video ID "B", respectively.

Upon receiving a request for changing the channel information from an administrator of the video broadcasting apparatus 10C, the channel information setting section 32a sets "100" as a degree of importance of the digest video A based on the number of viewings "100" for the digest video A and "50" as a degree of importance of the digest video B based on the number of viewings "50" for the digest video B.

Then, the channel information setting section 32a calculates "10" as the assigned number of channels for the digest video A (namely, the number "10" of channels is calculated by multiplying the total number of usable channels, i.e., "15", by a value that is resulted from dividing the degree of importance of the digest video A, i.e., "100", by a total degree of importance of the digest video A and the digest video B, i.e., "100+50").

Also, the channel information setting section 32a calculates "5" as the assigned number of channels for the digest video B (namely, the number "5" of channels is calculated by multiplying the total number of usable channels, i.e., "15", by a value that is resulted from dividing the degree of importance of the digest video B, i.e., "50", by the total degree of importance of the digest video A and the digest video B, i.e., "100+50").

The method of calculating the assigned number of channels assigned per digest video is not limited to the above-described example. As another example, the number of channels assigned per digest video may be calculated by using formulae shown in FIG. 12.

More specifically, upon receiving the request for changing the channel information from the administrator of the video broadcasting apparatus 10C, the channel information setting section 32a calculates "6000" as a degree of importance of the digest video A by using the formula shown at (A) in FIG. 12 (namely, the degree of importance "6000" is calculated by multiplying the playback time "60 sec" of the digest video A by the number of viewings "100" for the digest video A).

Also, the channel information setting section 32a calculates "1500" as a degree of importance of the digest video B by using the formula shown at (A) in FIG. 12 (namely, the degree of importance "1500" is calculated by multiplying the playback time "30 sec" of the digest video B by the number of viewings "50" for the digest video B).

Then, the channel information setting section 32a calculates "12" as the assigned number of channels for the digest video A by using the formula shown at (B) in FIG. 12 (namely, the assigned number "12" of channels is calculated by multiplying the total number of usable channels, i.e., "15", by a value that is resulted from dividing the degree of importance of the digest video A, i.e., "6000", by a total degree of importance of the digest video A and the digest video B, i.e., "6000+1500").

Further, the channel information setting section 32a calculates "3" as the assigned number of channels for the digest video B by using the formula shown at (B) in FIG. 12 (namely, the assigned number "3" of channels is calculated by multiplying the total number of usable channels, i.e., "15", by a value that is resulted from dividing the degree of importance of the digest video B. i.e., "1500", by the total degree of importance of the digest video A and the digest video B, i.e., "6000+1500").

Figure 13:
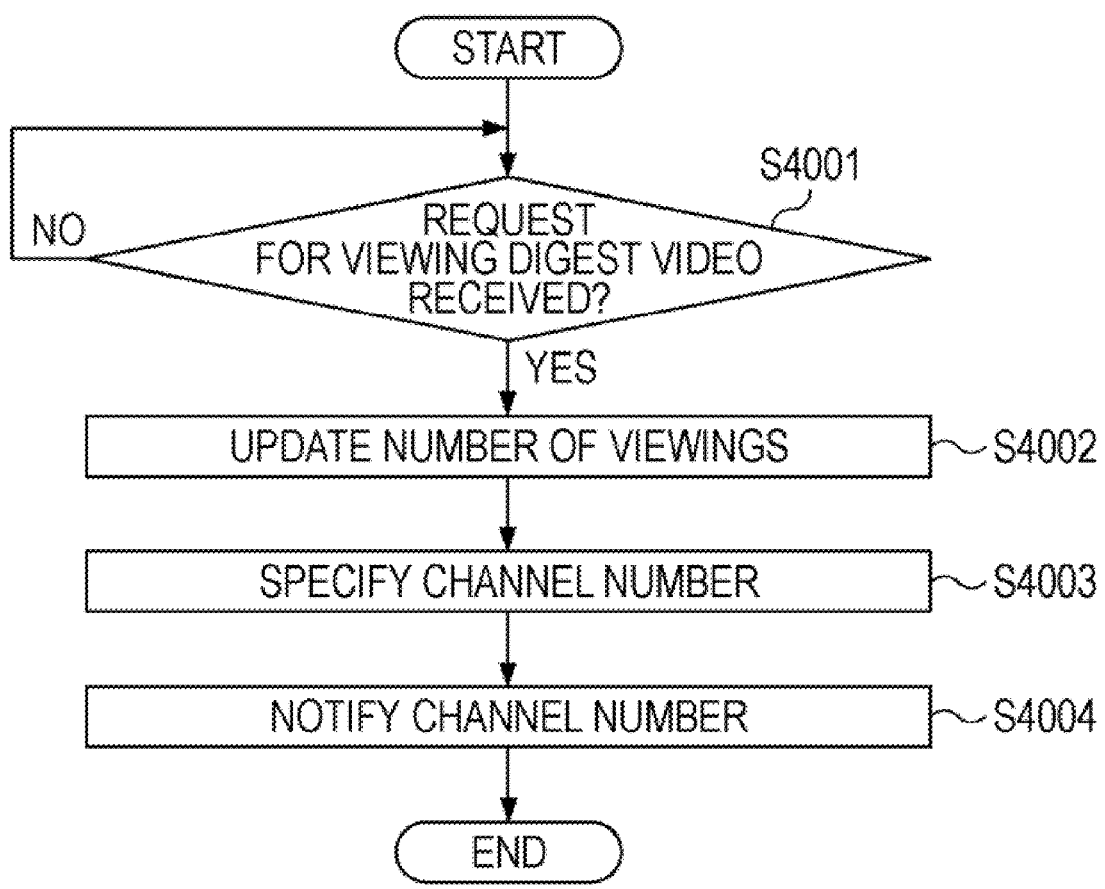
FIG. 13 depicts a channel number notifying process according to another example of an embodiment of the present invention.
Figure 14:
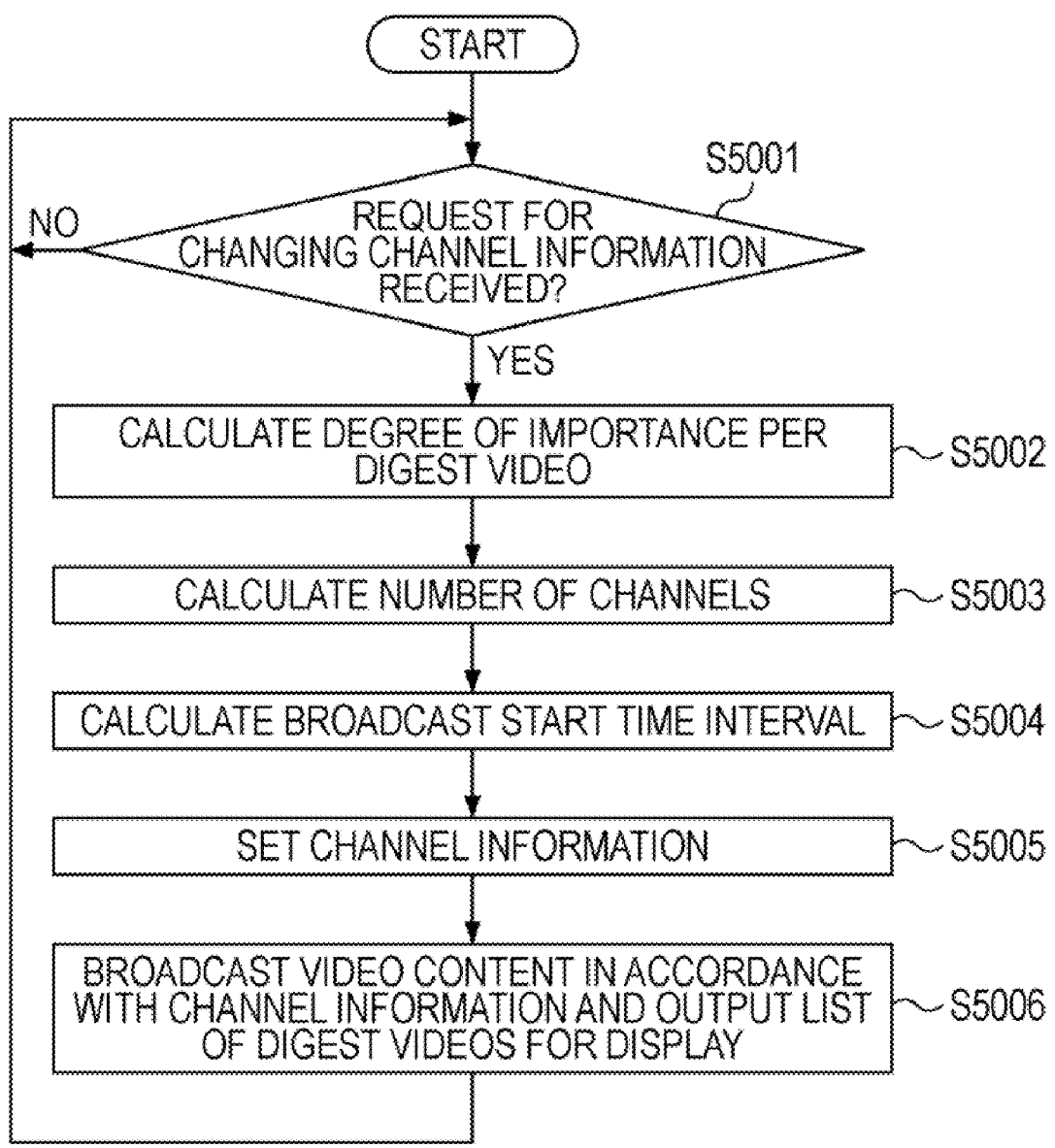
FIG. 14 depicts a digest video broadcasting process according to another example of an embodiment of the present invention.

FIG. 13 depicts a channel number notifying process executed by, e.g., the video broadcasting apparatus 10C. FIG. 14 depicts a digest video broadcasting process executed by, e.g., the video broadcasting apparatus 10C.

As shown in FIG. 13, upon receiving the request for viewing the digest video ("Yes" in step S4001), the video broadcasting apparatus 10C updates the number of viewings stored in the number-of-viewings storage section 31d (step S4002). Then, the video broadcasting apparatus 10C specifies the channel number which is set to a broadcast start time later than the time when the viewing request has been received (step S4003), and notifies the specified channel number to the viewing request source (step S4004). The channel number notifying process is then brought to an end.

As shown in FIG. 14, upon receiving the request for changing the channel information ("Yes" in step S5001), the video broadcasting apparatus 10C calculates the degree of importance per digest video (step S5002) and calculates the assigned number of channels per digest video (step S5003).

Further, it calculates the broadcast start time interval per digest video (step S5004) and sets the channel information (step S5005).

Then, the video broadcasting apparatus 10C broadcasts the same video content at the broadcast start time set per channel number in accordance with the channel information and outputs a list of the digest videos for displaying it (step S5006). Thereafter, the video broadcasting apparatus 10C repeatedly executes the above-described processing (steps S5001 to S5006). The digest video broadcasting process executed by the video broadcasting apparatus 10C is brought to an end at the same time as when the operation of the video broadcasting apparatus 10 is stopped.

According to the video broadcasting apparatus 10C, as described above, each digest video can be broadcast at the assigned number of channels in match with the demand of the viewer. For example, a smaller number of channels are assigned to the digest video for which the number of viewings is smaller (i.e., the demand of the viewer is lower), and a larger assigned number of channels are assigned to the digest video for which the number of viewings is larger (i.e., the demand of the viewer is higher). Therefore, the digest video which is viewed by the viewer at a higher frequency can be broadcast through a larger assigned number of channels.

Alternatively, the video broadcasting apparatus 10C may be modified so as to notify that a digest video has been broadcast in real-time broadcasting, for example, in a time zone where the viewer does not view the real-time broadcasting.

Taking into account the above point, still another circumstance is described below in connection with the case of specifying the digest video that is broadcast in real-time broadcasting during a period from registration of a viewer ID to cancellation of the registration, and notifying the channel number at which broadcast of the specified digest video is scheduled. In the following, the configuration of a video broadcasting apparatus according to the still other embodiment and the flow of a channel number notifying process executed by the video broadcasting apparatus are described in order. Finally, advantages of this embodiment are described.

Figure 15:
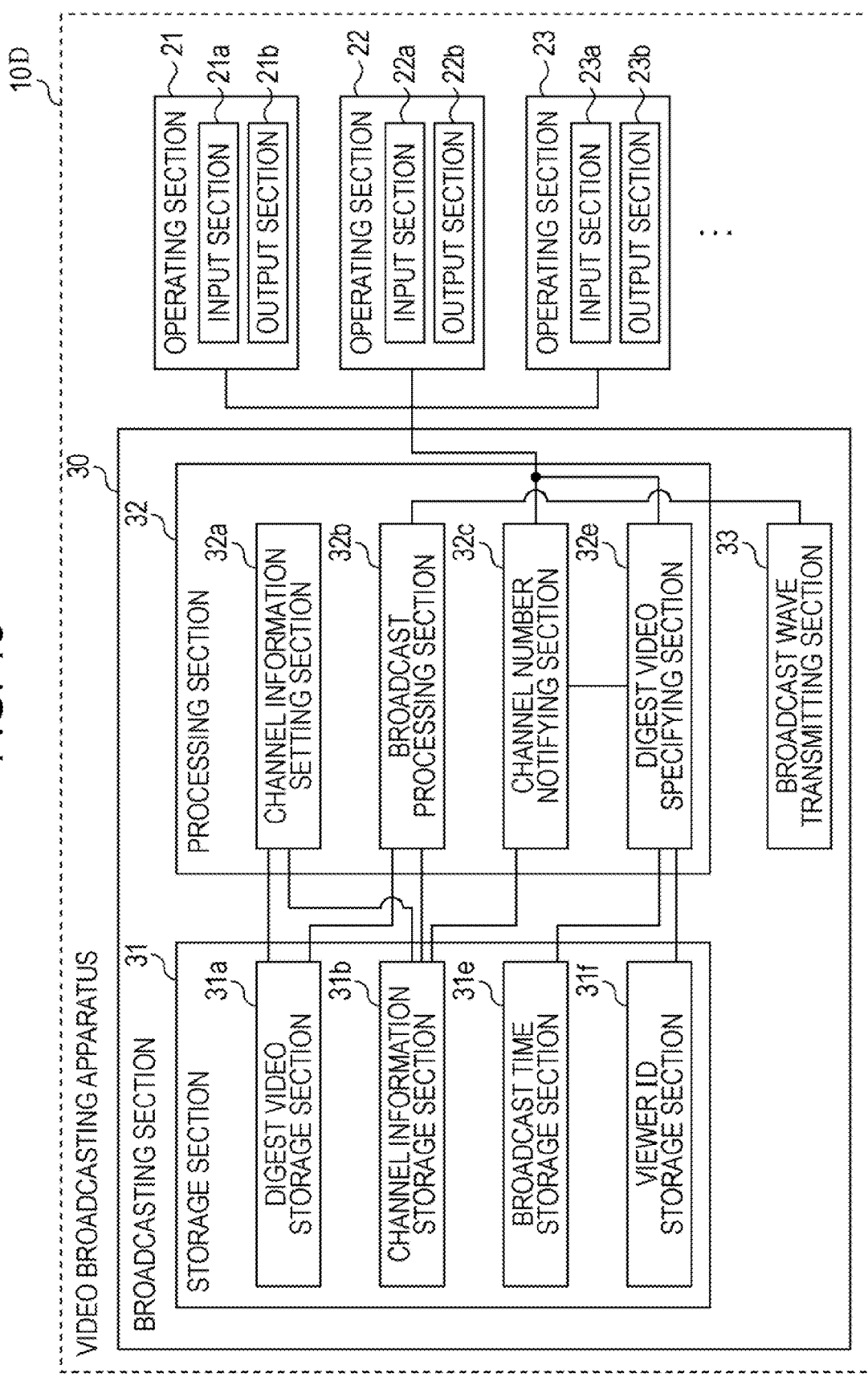
FIG. 15 depicts a video broadcasting apparatus according to another example of an embodiment of the present invention.

FIG. 15 is depicts a configuration of the video broadcasting apparatus 10D. FIG. 16 illustrates one example of information stored in a broadcast time storage section. FIG. 17 illustrates one example of information stored in a viewer ID storage section.

The configuration of the video broadcasting apparatus 10D differs from that of the video broadcasting apparatus 10C by additionally including a broadcast time storage section 31e, a viewer ID storage section 31f, and a digest video specifying section 32e, as well as points described below.

More specifically, the broadcast time storage section 31e stores, in a corresponding relation to the digest video ID, the broadcast time at which each digest video has been broadcast in real-time broadcasting. Describing that process in connection with one practical example, as shown in FIG. 16, the broadcast time storage section 31e stores the broadcast time "18:30:00 hours" in a corresponding relation to the digest video ID "A". Also, the "broadcast time" stored in the broadcast time storage section 31e is information that is stored at the same time as, for example, when each digest video is stored in the digest video storage section 31a.

The viewer ID storage section 31f stores the viewer ID specifying the viewer and the registration time indicating the time at which the viewer ID has been registered, in a mutually corresponding relation. Describing that process in connection with one practical example, as shown in FIG. 17, the viewer ID storage section 31f stores, in a corresponding relation to a viewer ID "ΔΔΔΔ", the registration time "18:25:00 hours" at which the viewer ID "ΔΔΔΔ" has been registered.

Upon receiving the viewer ID along with a registration request, the digest video specifying section 32e registers, in the viewer ID storage section 31f, the viewer ID and the registration time at which the registration request has been received.

Then, upon receiving the viewer ID along with a registration cancel request, the digest video specifying section 32e specifies, from among the broadcast times stored in the broadcast time storage section 31e, the digest video that has been broadcast in the real-time broadcasting during a period from the registration time that is stored in the viewer ID storage section 31f in a corresponding relation to the digest video ID, to the registration cancel time at which the registration cancel request has been received.

Describing that process in connection with one practical example, upon receiving the viewer ID "ΔΔΔΔ" along with the registration request at "18:25:00 hours" through the input section 21a, the digest video specifying section 32e registers, in the viewer ID storage section 31f, the viewer ID "ΔΔΔΔ" and the registration time "18:25:00 hours" in a mutually corresponding relation.

Then, upon receiving the viewer ID "ΔΔΔΔ" along with the registration cancel request at "18:40:13 hours" through the input section 21a, the digest video specifying section 32e refers to the broadcast time storage section 31e and specifies that the digest video A having the digest video ID "A" has been broadcast in the real-time broadcasting during a period from "18:25:00 hours" to "18:40:13 hours".

Further, the digest video specifying section 32e notifies, to the channel number notifying section 32c, the fact that the digest video ID "A" has been specified and the registration cancel request has been received at "18:40:13" through the input section 21a.

The channel number notifying section 32c specifies, based on the channel information set by the channel information setting section 32a, the channel number which is set to a broadcast start time later than the time when the registration cancel request has been received. The specified channel number is then notified to the registration cancel request source.

Describing the above process in connection with one practical example, when the notification is received which indicates that the digest video ID "A" has been specified and the registration cancel request has been received at "18:40:13 hours" through the input section 21a, the channel number notifying section 32c reads the channel information from the channel information storage section 31b and specifies the channel number "Ch4" from among the channel numbers "Ch1 to Ch10" corresponding to the digest video ID "A", which is set to the broadcast start time "18 sec".

Then, the channel number notifying section 32c notifies, through the output section 21b of the operating section 21, that broadcast of the digest video A is scheduled at the channel number "Ch4".

Figure 18:
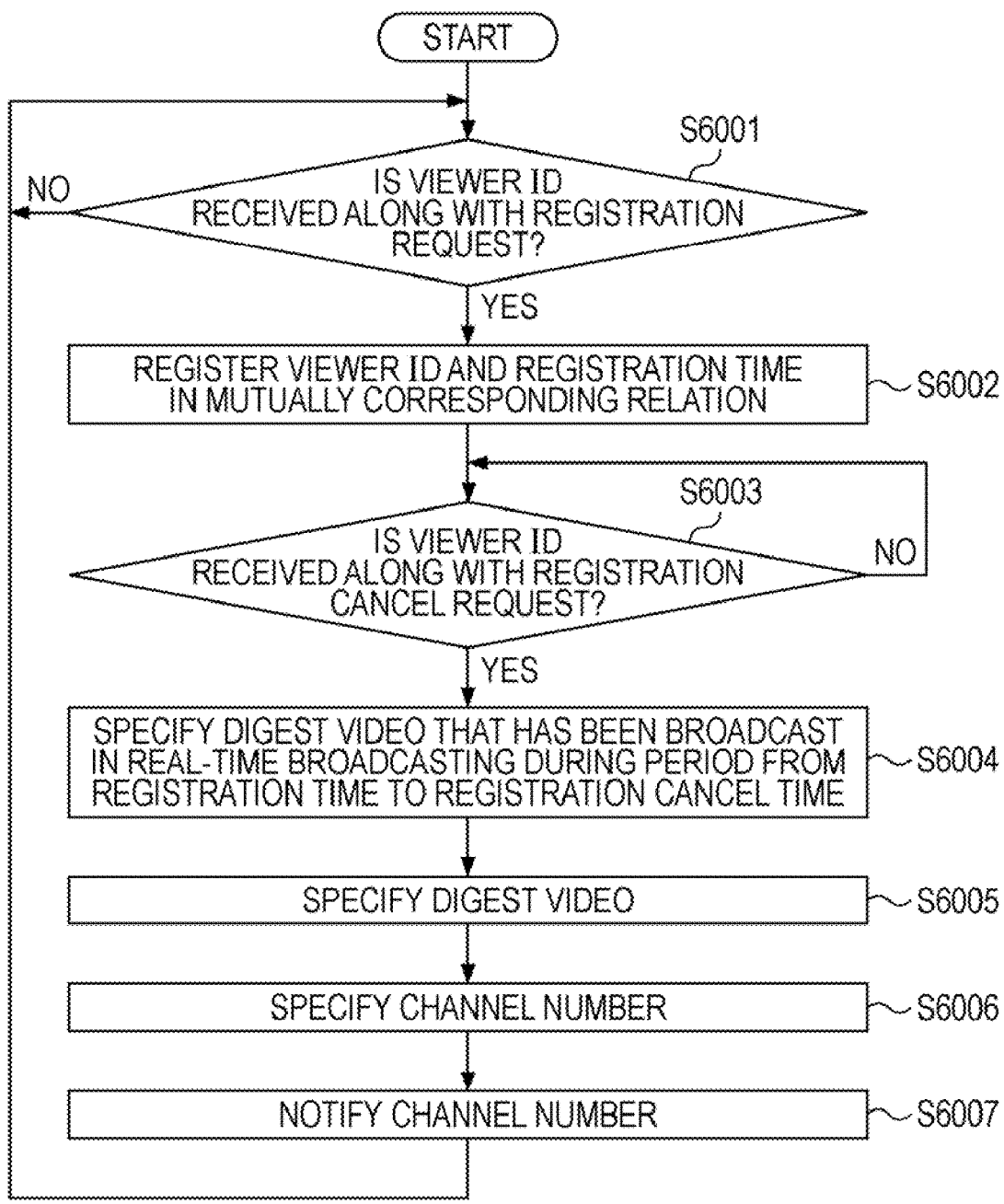
FIG. 18 a channel number notifying process according to another example of an embodiment of the present invention.

FIG. 18 depicts a channel number notifying process executed by, e.g., the video broadcasting apparatus 10D.

As shown in FIG. 18, upon receiving the viewer ID along with the registration request ("Yes" in step S6001), the video broadcasting apparatus 10D registers the viewer ID and the registration time in a mutually corresponding relation (step S6002).

Then, upon receiving the viewer ID along with the registration cancel request ("Yes" in step S6003), the video broadcasting apparatus 10D specifies the digest video that has been broadcast in the real-time broadcasting during the period from the registration time to the registration cancel time (step S6004).

Subsequently, the video broadcasting apparatus 10D specifies, based on the channel information, the channel number which is set to a broadcast start time later than the time when the registration cancel request has been received (step S6005), and notifies the specified channel number to the registration cancel request source (step S6006). The channel number notifying process is then brought to an end.

As described above, the video broadcasting apparatus 10D enables the viewer to view even the digest video that the viewer has missed unconsciously. For example, by causing the viewer to register the viewer ID when the viewer temporarily stops viewing of the real-time broadcasting to finish business or the like, and then to cancel the registration of the viewer ID after finishing the business or the like, the viewer can view the digest video that has been broadcast in the real-time broadcasting in the time zone where the viewer has been engaged in the business or the like.

The video broadcasting apparatus 10 has been described in connection with the case of specifying the broadcast channel by the video broadcasting apparatus 10D and notifying the specified broadcast channel to the viewing request source. However, the present invention is not limited to this circumstance, and the portable terminal may, e.g., specify the broadcast channel.

Taking into account the above point, still another circumstance is described below in connection with the case where the portable terminal specifies the broadcast channel by using the channel information received from the video broadcasting apparatus 10D.

Figure 19:
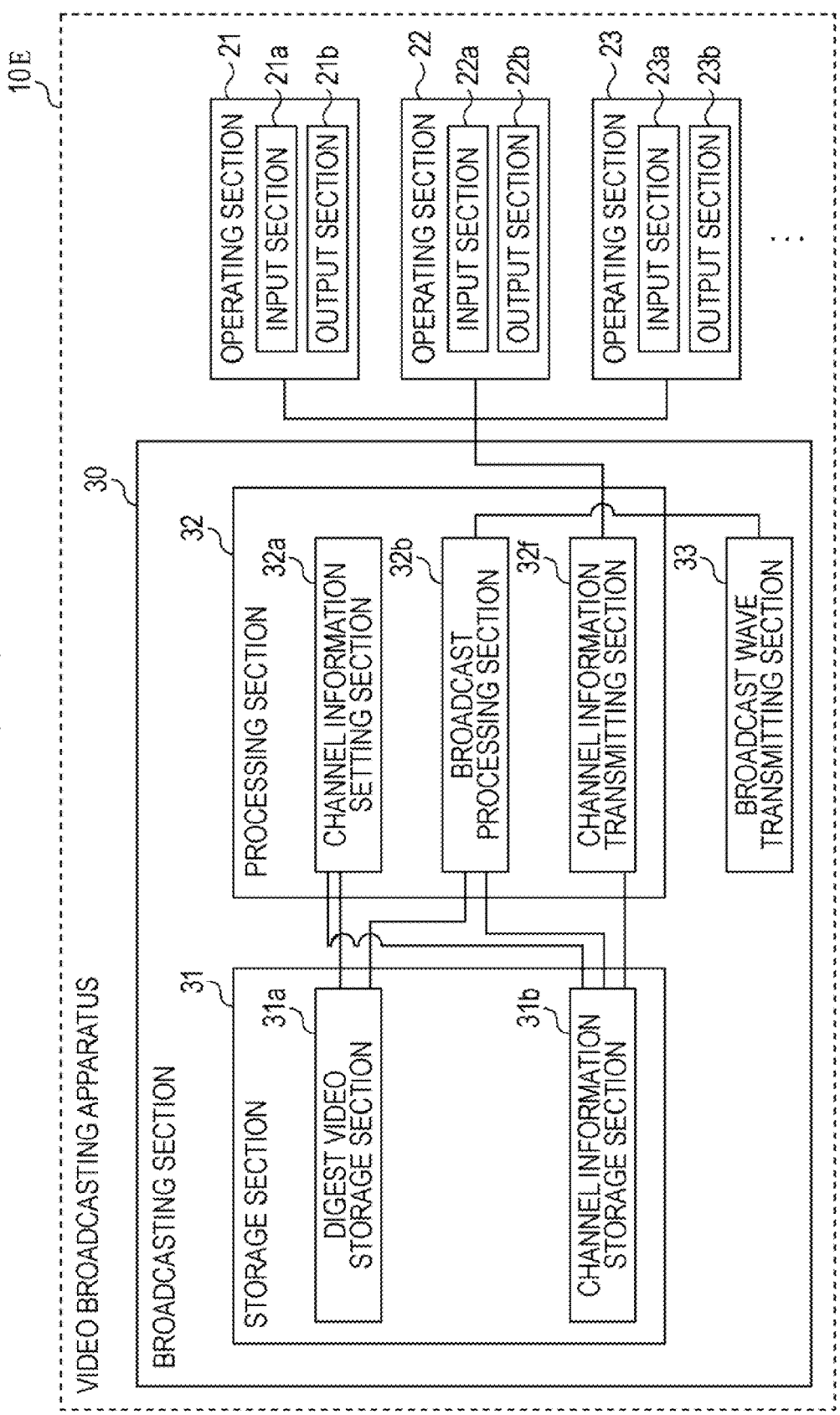
FIG. 19 depicts a configuration of a video broadcasting apparatus according to another an example of embodiment of the present invention.
Figure 21A:
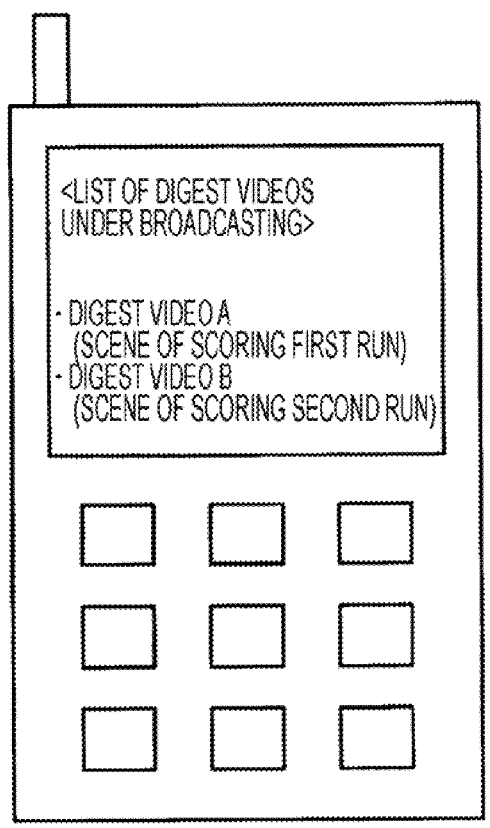
FIG. 21A depicts information to be displayed on an output section of a portable terminal according to an example of an embodiment of the present invention.
Figure 21B:
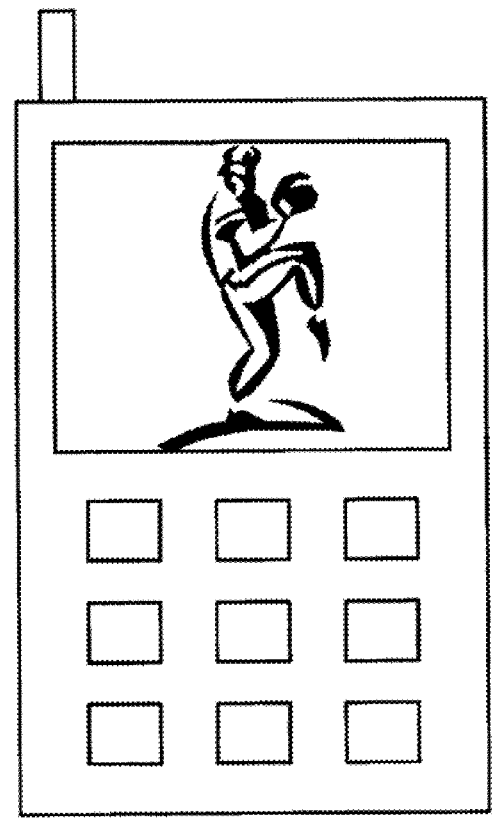
FIG. 21B depicts information to be displayed on an output section of a portable terminal according to an example of an embodiment of the present invention.

FIG. 19 depicts a video broadcasting apparatus 10E. FIG. 20 depicts a configuration of portable terminal 40. FIGS. 21A and 21B depict information to be displayed on an output section of the portable terminal 40.

As shown in FIG. 19, the configuration of the video broadcasting apparatus 10E differs from that of one or more of the video broadcasting apparatuses described above by including a channel information transmitting section 32*f* instead of the channel number notifying section 32*c*, and points described below.

More specifically, the channel information transmitting section 32*f* broadcasts the channel information, which has been set by the channel information setting section 32*a*, to the portable terminal. In practice, when the channel information is stored in the channel information storage section 31*b*, the channel information transmitting section 32*f* broadcasts the channel information to the portable terminal through the broadcast wave transmitting section 33.

As shown in FIG. 20, the portable terminal 40 comprises an input section 41, an output section 42, an antenna 43, a storage section, e.g., a memory, 44, and a processing section 45.

The input section 41 receives input of various kinds of information. More specifically, the input section 41 includes operating buttons, a microphone, etc., and it receives, e.g., the request for viewing the digest video A.

The output section 42 outputs various kinds of information. More specifically, the output section 42 includes a monitor, a display, a speaker, etc. For example, the output section 42 outputs and displays a list of the digest videos as shown in FIG. 21A, and plays back the digest video as shown in FIG. 21B.

The antenna 43 receives radio signals, such as broadcasting waves. More specifically, the antenna 43 receives the digest video and the channel information, which are broadcast from the video broadcasting apparatus 10E.

The storage section 44 stores data and programs which are required for various processes executed by the processing section 45. As a component closely related to the present invention, in particular, the storage section 44 includes a channel information storage section 44*a*.

The channel information storage section 44*a* stores the channel information received from the video broadcasting apparatus 10E. The information stored in the channel information storage section 44*a* is the same as the information stored in the channel information storage section 31*b* of the video broadcasting apparatus 10A (see FIG. 4).

The processing section 45 includes an internal memory for storing control programs such as an OS (Operating System), programs prescribing various processing procedures, and necessary data, and it executes various processes by using them. As components closely related to the present invention, in particular, the processing section 45 includes a summary notifying section 45*a* and a digest video receiving section 45*b*.

Upon receiving the channel information from the video broadcasting apparatus 10E, the summary notifying section 45*a* notifies the viewer of the summary of each digest video so that the viewer can recognize each digest video which is scheduled to be broadcast.

More specifically, when the summary notifying section 45*a* receives through the antenna 43 the channel information broadcast from the video broadcasting apparatus 10E, it stores the channel information in the channel information storage section 44*a*. Then, the summary notifying section 45*a* produces a list of the digest videos and outputs the list of the digest videos through the output section 42 for displaying it (see FIG. 21A).

Upon receiving the request for viewing the digest video from the viewer in response to the notification by the summary notifying section 45*a*, the digest video receiving section 45*b* specifies, based on the received channel information, the channel number from among the channel numbers corresponding to the digest video ID of the digest video demanded by the viewing request, which is set to a broadcast start time later than the time when the viewing request has been received. The digest video receiving section 45*b* then receives the digest video at the channel having the specified channel number.

Describing the above process in connection with one practical example, when the digest video receiving section 45*b* receives the request for viewing the digest video A at a time "13 sec" through the input section 41, it reads the channel information from the channel information storage section 44*a* and specifies the channel number "Ch4" from among the channel numbers "Ch1 to Ch10" corresponding to the digest video ID "A", which is set to the broadcast start time "18 sec".

Further, the digest video receiving section 45*b* receives the digest video A at the channel having the channel number "Ch4" through the antenna 43 and plays back the received digest video through the output section 42 (see FIG. 21B).

Figure 22:
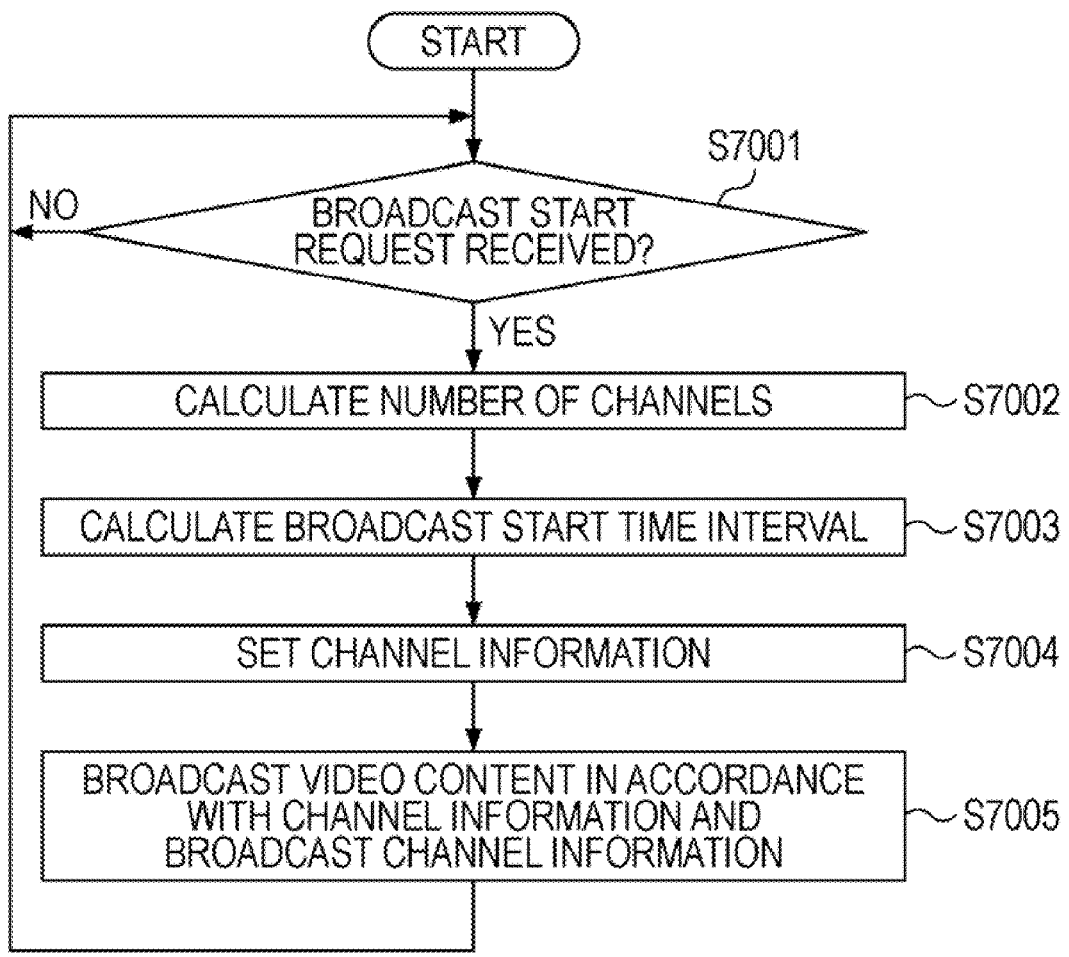
FIG. 22 depict processing executed by a video broadcasting apparatus according to another example of an embodiment of the present invention.
Figure 23:
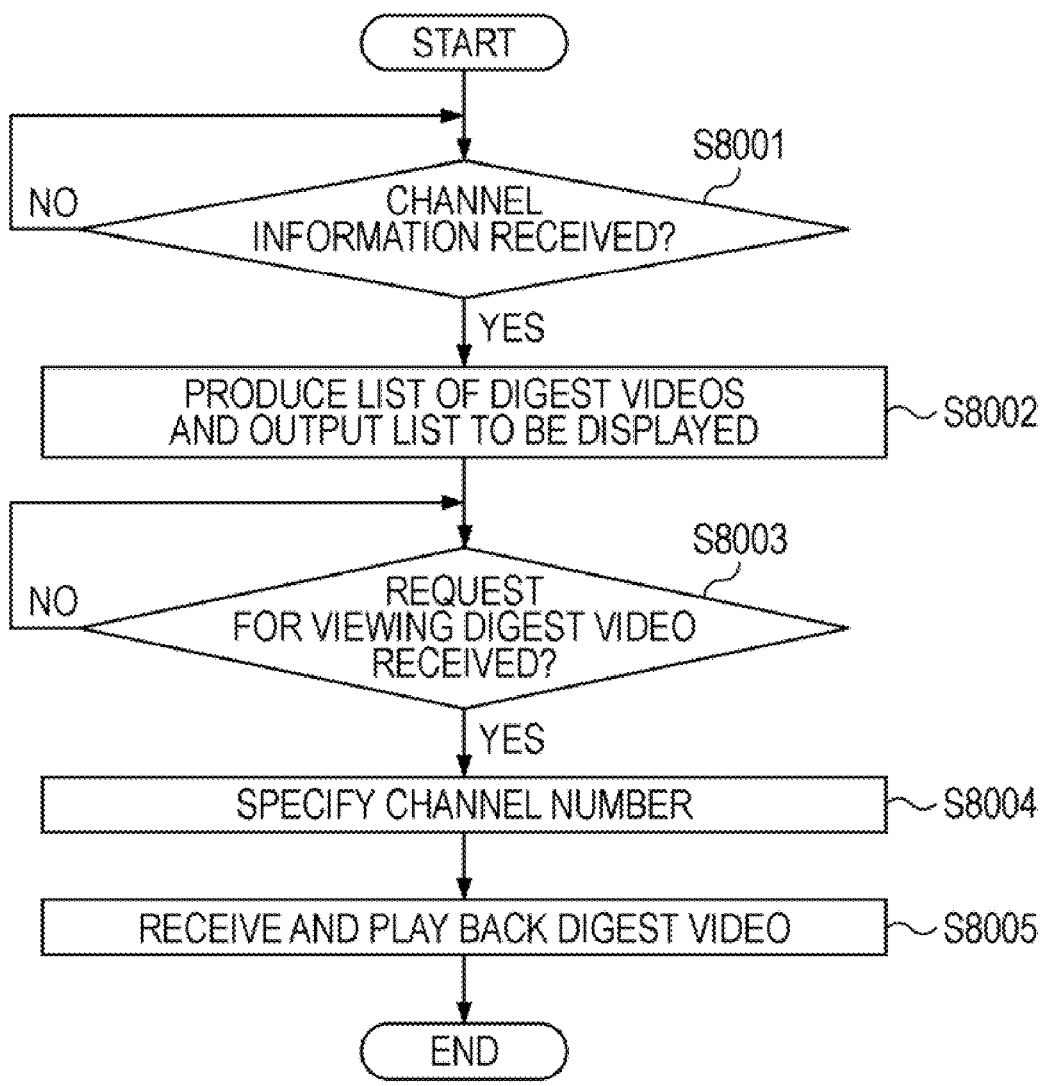
FIG. 23 depicts processing executed by a portable terminal according to an example of an embodiment of the present invention.

The processing executed by the video broadcasting apparatus 10E and the portable terminal 40 of the video broadcasting system will be described below with reference to FIGS. 22 and 23. FIG. 22 depicts processing executed by, e.g., the video broadcasting apparatus 10E. FIG. 23 depicts processing executed by. e.g., the portable terminal 40.

As shown in FIG. 22, upon receiving the broadcast start request ("Yes" in step S7001), the video broadcasting apparatus 10 calculates the assigned number of channels per digest video (step S7002), calculates the broadcast start time interval per digest video (step S7003), and sets the channel information (step S7004).

Then, the video broadcasting apparatus 10E broadcasts the same video content at the broadcast start time set per channel number in accordance with the channel information and also broadcasts the channel information (step S7005). Thereafter, the video broadcasting apparatus 10E repeatedly executes the above-described processing (steps S7001 to S7005). The processing executed by the video broadcasting apparatus 10E is brought to an end at the same time as when the operation of the video broadcasting apparatus 10E is stopped.

As shown in FIG. 23, upon receiving the channel information ("Yes" in step S8001), the portable terminal 40 produces a list of the digest videos and outputs the list for displaying it (step S8002).

Then, upon receiving the request for viewing the digest video from the viewer ("Yes" in step S8003), the portable terminal 40 specifies the channel number which is set to a broadcast start time later than the time when the viewing request has been received (step S8004), and receives the digest video at the channel having the specified channel number for playing back it (step S8005). Further, the portable terminal 40 receives an instruction to play back the digest video from the viewer and brings the processing to an end.

While the video broadcasting apparatus 10E includes the viewer ID storage section 31*f* for storing the registration time therein, the present invention is not limited to the same, and the portable terminal may store the registration time. For example, the video broadcasting apparatus 10E can be modified such that the portable terminal transmits the registration time and the registration cancel time to the video broadcasting apparatus 10E, and the video broadcasting apparatus 10E specifies the digest video which has been broadcast in the real-time broadcasting during the period from the registration time to the registration cancel time.

The processing procedures, the control procedures, the concrete names, and information including various data and parameters (e.g., the stored information shown in FIGS. 4, 11, 16 and 17 and display information shown in FIGS. 3 and 21), which are described in the specification and are shown in the drawings, can be optionally changed unless otherwise specified.

Also, the components of each apparatus are illustrated in the drawings with intent to explain their functional and conceptual operations, and those components are not necessarily required to be constructed as per shown from the physical point of view. Stated another way, practical forms of the components of each apparatus, including separation and integration of the components, are not limited to the illustrated ones. The whole or part of each apparatus can be functionally or physically separated or integrated in optional units depending on various loads and situations in use. For example, the channel information setting section 32*a* and the broadcast processing section 32*b*, shown in FIG. 2, can be integrated together.

Further, the whole or optional part of the processing functions executed by each apparatus can be realized with a CPU and a program that is analyzed and executed by the CPU, or with hardware in the form of wired logics.

Figure 24:
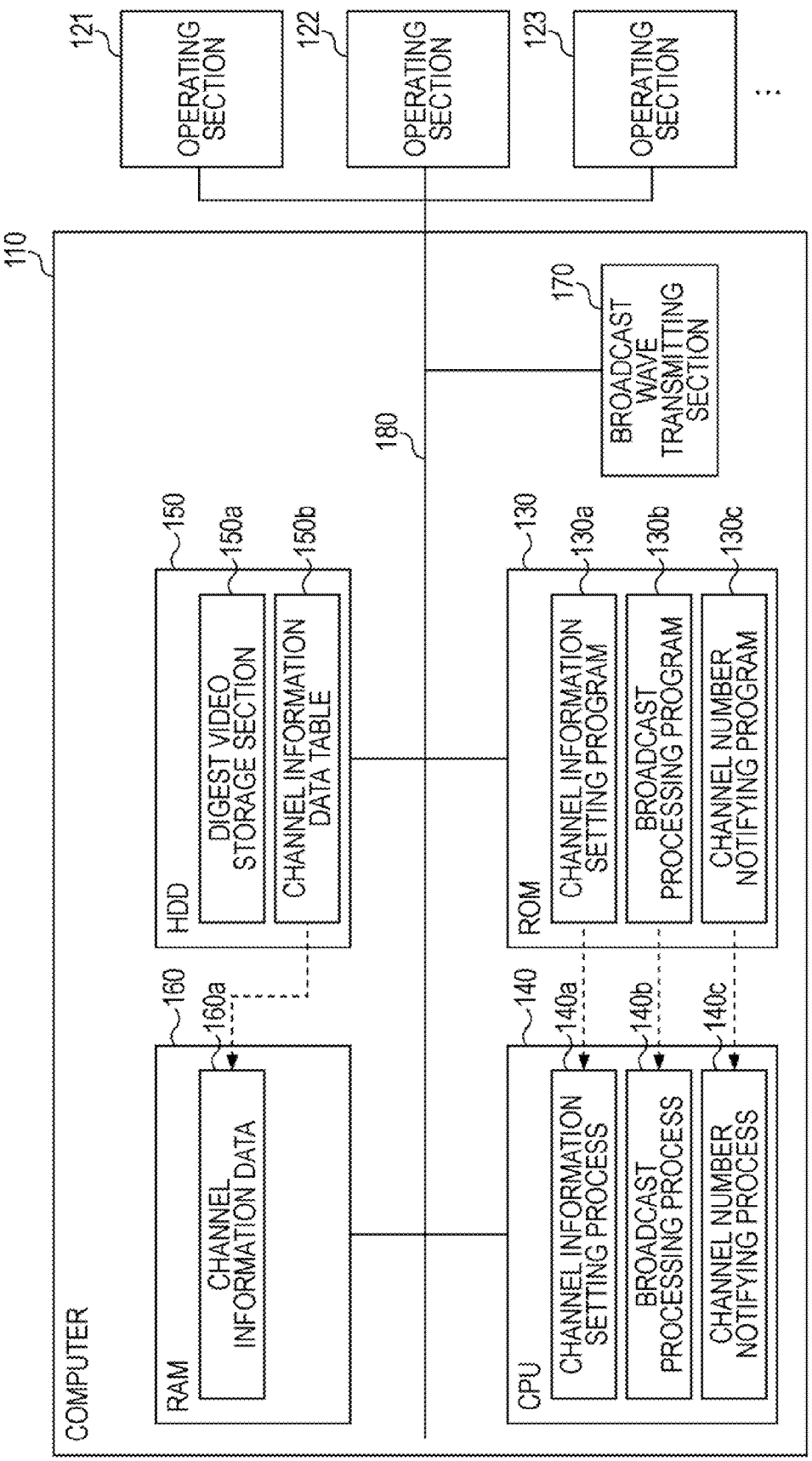
FIG. 24 depicts a computer for executing a video broadcasting program according to an example of an embodiment of the present invention.

Meanwhile, the present invention may be realized with execution of a previously prepared program by a computer that serves as the broadcasting section 30 of the video broadcasting apparatus 10E. Taking into account such a point, one example of a computer for executing a video broadcasting program, which has similar functions to those of one or more of the video broadcasting apparatuses discussed above will be described below with reference to FIG. 24. FIG. 24 depicts a computer for executing the video broadcasting program.

As shown in FIG. 24, a computer 110 serving as the broadcasting section 30 of one or more of the video broadcasting apparatuses described above comprises operating sections 121 to 123, a ROM 130, a CPU 140, a HDD 150, a RAM 160, and a broadcast wave transmitting section 170, which are interconnected via a bus 180.

The ROM 130 previously stores a video broadcasting program having similar functions to those of the video broadcasting apparatus 10A, e.g., a channel information setting program 130*a*, a broadcast processing program 130*b*, and a channel number notifying program 130*c*, as shown in FIG. 24. Those programs 130*a* to 130*c* may be integrated together or separated into pieces, as required, similarly to the components of the video broadcasting apparatus 10 shown in FIG. 2.

With the CPU 140 reading the programs 130*a* to 130*c* from the ROM 130 and executing them, the programs 130*a* to 130*c* function respectively as a channel information setting process 140*a*, a broadcast processing process 140*b*, and a channel number notifying process 140*c*, as shown in FIG. 24. The processes 140*a* to 140*c* correspond respectively to the channel information setting section 32*a*, the broadcast processing section 32*b*, and the channel number notifying section 32*c* shown in FIG. 2.

Further, as shown in FIG. 24, the HDD 150 has memory in which is included a digest video storage section 150*a* and a channel information data table 150*b*. The CPU 140 reads channel information data 160*a* from the channel information data table 150*b* for loading it into the RAM 160, and executes processing in accordance with the channel information data 160*a* loaded into the RAM 160. The channel information data 160*a* corresponds to the channel information storage section 31*b* shown in FIG. 2.

The programs 130*a* to 130*c* are not always required to be stored in the ROM 130 from the beginning. For example, the programs 130*a* to 130*c* may be stored, for example, in a "portable physical medium" such as a flexible disk (FD), a CD-ROM, a DVD disk, a magneto-optical disk or an IC card, which is inserted to the computer 110, a "stationary physical medium" such as a HDD disposed inside or outside the computer 110, or "another computer (server)" that is connected to the computer 110 via a public line, the Internet, a LAN or a WAN. In that case, the computer 110 reads the programs from any of those media, etc. and executes the programs.

The various video broadcasting methods described above can also be realized by executing the previously prepared program with a computer, e.g., a personal computer or a work station. The program can be distributed via a network, e.g., the Internet. Further, the program may be recorded in a computer-readable recording medium, such as a hard disk, a flexible disk (FD), a CD-ROM, an MO, or a DVD, and may be executed by a computer reading the program from the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable medium storing a video broadcasting program causing a computer to perform a process comprising:

calculating an assigned number of channels, which are assigned per video content, based on a total number of channels usable for broadcasting video contents and corresponding playback times;

calculating, per video content, a broadcast start time interval when the same video content is broadcast at plural channels, based on the playback time of each video content and the assigned number of channels;

setting, for each video content, channel information including, in a mutually corresponding relation, a content ID specifying the video content, the channel numbers corresponding to the assigned number of channels, and a broadcast start time set per channel number at the calculated broadcast start time interval;

broadcasting the same video content at the broadcast start time set per channel number in accordance with the set channel information; and specifying, when a request for viewing the video content is received, the channel number from among the channel numbers corresponding to the content ID of the video content demanded by the viewing request based on the set channel information, which is set to a broadcast start time later than a time when the viewing request has been received, and notifying the specified channel number to a viewing request source.

2. The non-transitory computer-readable medium storing a video broadcasting program according to claim 1, wherein the video broadcasting method further comprises:

previously storing a preparation time required for the video player to receive the video content, wherein the procedure of specifying the channel number specifies, based on the channel information set in the channel information setting procedure, the channel number which is set to a broadcast start time later than a time resulting from adding the preparation time stored in the preparation time storing procedure to the time when the viewing request has been received.

3. The non-transitory computer-readable medium storing a video broadcasting program according to claim 1, wherein the video broadcasting method further comprises:

counting a number of times the viewing request has been received per video content, wherein when a request for changing the channel information is received, the procedure of calculating the assigned number of channels recalculates the assigned number of channels by calculating a degree of importance per video content based on the number of viewings measured in the number-of-viewings counting procedure, and by multiplying the total number of channels by a value that is resulted from dividing each degree of importance by a total degree of importance.

4. The non-transitory computer-readable medium storing a video broadcasting program according to claim 1, wherein the video broadcasting method further comprises:

storing a broadcast time at which each video content has been broadcast in real-time broadcasting, in a corresponding relation to the content ID;

when a viewer ID is received along with a registration request, storing the viewer ID and a registration time at which the registration request has been received, in a mutually corresponding relation; and when the viewer ID is received along with a registration cancel request, specifying, from among the video contents corresponding to the stored broadcast times, the video content which has been broadcast in the real-time broadcasting during a period from the registration time stored corresponding to the relevant viewer ID to a registration cancel time when the registration cancel request has been received, wherein the procedure of specifying the channel number specifies, based on the channel information set in the channel information setting procedure, the channel number which is set to a broadcast start time later than the time when the registration cancel request has been received, and notifying the specified channel number to a registration cancel request source.

5. A video broadcasting method for broadcasting video contents which are to be played back by a video player, comprising:

calculating an assigned number of channels, which are assigned per video content, based on a total number of channels usable for broadcasting the video contents and a playback time of each video content;

calculating, per video content, a broadcast start time interval when the same video content is broadcast at plural channels, based on the playback time of each video content and the assigned number of channels;

setting, using a processor, for each video content, channel information including, in a mutually corresponding relation, a content ID specifying the video content, the channel numbers corresponding to the assigned number of channels, and a broadcast start time set per channel number at the calculated broadcast start time interval;

broadcasting the same video content at the broadcast start time set per channel number in accordance with the set channel information; and specifying, using the processor, when a request for viewing the video content is received, the channel number from among the channel numbers corresponding to the content ID of the video content demanded by the viewing request based upon the set channel information, which is set to a broadcast start time later than a time when the viewing request has been received, and notifying the specified channel number to a viewing request source.

6. The video broadcasting method according to claim 5, further comprising:

previously storing a preparation time required for the video player to receive the video content, wherein the procedure of specifying the channel number specifies, based on the channel information set in the channel information setting procedure, the channel number which is set to a broadcast start time later than a time resulting from adding the preparation time stored in the preparation time storing procedure to the time when the viewing request has been received.

7. The video broadcasting method according to claim 5, further comprising:

counting a number of times the viewing request has been received per video content, wherein when a request for changing the channel information is received, the procedure of calculating the assigned number of channels recalculates the assigned number of channels by calculating a degree of importance per video content based on the number of viewings counted in the number-of-viewings counting procedure, and by multiplying the total number of channels by a value that is resulted from dividing each degree of importance by a total degree of importance.

8. The video broadcasting method according to claim 5, further comprising:
- storing a broadcast time at which each video content has been broadcast in real-time broadcasting, in a corresponding relation to the content ID;
- when a viewer ID is received along with a registration request, storing the viewer ID and a registration time at which the registration request has been received, in a mutually corresponding relation; and
- when the viewer ID is received along with a registration cancel request, specifying, from among the video contents corresponding to the stored broadcast times, the video content which has been broadcast in the real-time broadcasting during a period from the registration time stored corresponding to the relevant viewer ID to a registration cancel time when the registration cancel request has been received,
- wherein the procedure of specifying the channel number specifies, based on the channel information set in the channel information setting procedure, the channel number which is set to a broadcast start time later than the time when the registration cancel request has been received, and notifying the specified channel number to a registration cancel request source.

9. A video broadcasting apparatus for broadcasting video contents which are to be played back by a video player, comprising:
- a number-of-channel calculating section for calculating an assigned number of channels, which are assigned per video content, based on a total number of channels usable for broadcasting the video contents and a playback time of each video content;
- a broadcast start-time interval calculating section for calculating, per video content, a broadcast start time interval when the same video content is broadcast at plural channels, based on the playback time of each video content and the assigned number of channels which has been calculated in the number-of-channel calculating section per video content;
- a channel information setting section for setting, for each video content, channel information containing, in a mutually corresponding relation, a content ID specifying the video content, the channel numbers corresponding to the assigned number of channels, and a broadcast start time set per channel number at the calculated broadcast start time interval;
- a video content broadcasting section for broadcasting the same video content at the broadcast start time set per channel number in accordance with the set channel information; and
- a channel number notifying section for, when a request for viewing the video content is received, specifying, based on the set channel information, the channel number from among the channel numbers corresponding to the content ID of the video content demanded by the viewing request, which is set to a broadcast start time later than a time when the viewing request has been received, and notifying the specified channel number to a viewing request source.

10. A video broadcasting system comprising a video player for playing back received video contents and a video broadcasting apparatus for broadcasting the video contents to the video player,
the video broadcasting apparatus comprising:
- a number-of-channel calculating section for calculating an assigned number of channels, which are assigned per video content, based on a total number of channels usable for broadcasting the video contents and a playback time of each video content;
- a broadcast start-time interval calculating section for calculating, per video content, a broadcast start time interval when the same video content is broadcast at plural channels, based on the playback time of each video content and the assigned number of channels which has been calculated in the number-of-channel calculating section per video content;
- a channel information setting section for setting, for each video content, channel information containing, in a mutually corresponding relation, a content ID specifying the video content, the channel numbers corresponding to the assigned number of channels, and a broadcast start time set per channel number at the calculated broadcast start time interval; and
- a video content broadcasting section for broadcasting the same video content at the broadcast start time set per channel number in accordance with the set channel information, and
- a channel information broadcasting section for broadcasting, to the video player, the channel information set by the channel information setting section, the video player comprising:
- a summary notifying section for, when the channel information is received from the video broadcasting apparatus, notifying a summary of each video content to a viewer, thus allowing the viewer to recognize each video content that is scheduled to be broadcast, and
- a video content receiving section for, when a request for viewing the video content is received from the viewer in response to the notification by the summary notifying section, specifying, based on the received channel information, the channel number from among the channel numbers corresponding to the content ID of the video content demanded by the viewing request, which is set to a broadcast start time later than a time when the viewing request has been received, and receiving the video content at a channel having the specified channel number.

11. A video broadcasting method, comprising:
- assigning, using a processor, channels to a video content based on a total number of channels usable for broadcasting the video content and a playback time of the video content;
- calculating a broadcast start time interval of the channels assigned to the video content based on the playback time of the video content and number of the channels assigned to the video content;
- setting, using the processor, broadcast start time per channel of the channels assigned to the video content; and
- broadcasting the video content at the broadcast start time set per the channel.

* * * * *